(12) United States Patent
Jung et al.

(10) Patent No.: US 9,093,121 B2
(45) Date of Patent: Jul. 28, 2015

(54) DATA MANAGEMENT OF AN AUDIO DATA STREAM

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 170 days.

(21) Appl. No.: 13/135,255

(22) Filed: Jun. 29, 2011

(65) Prior Publication Data

US 2012/0095579 A1 Apr. 19, 2012

Related U.S. Application Data

(63) Continuation of application No. 11/396,279, filed on Mar. 31, 2006, now abandoned, and a continuation-in-part of application No. 11/364,496, filed on Feb. 28, 2006, and a continuation-in-part of application No. 11/376,627, filed on Mar. 15, 2006, now abandoned.

(51) Int. Cl.
*G06F 17/00* (2006.01)
*G11B 27/30* (2006.01)
(Continued)

(52) U.S. Cl.
CPC .............. *G11B 27/30* (2013.01); *G11B 27/034* (2013.01); *G11B 27/22* (2013.01); *G11B 27/34* (2013.01); *H04N 21/233* (2013.01); *H04N 21/422* (2013.01); *H04N 21/439* (2013.01); *H04N 21/8455* (2013.01); *G11B 27/002* (2013.01); *G11B 2020/00014* (2013.01); *G11B 2020/00079* (2013.01)

(58) Field of Classification Search
None
See application file for complete search history.

(56) References Cited

U.S. PATENT DOCUMENTS 4,124,871 A 11/1978 Morrin, II
4,249,218 A * 2/1981 Davis et al. ............... 360/13
(Continued)

FOREIGN PATENT DOCUMENTS

EP 0940711 B1 11/2003
JP 5064225 3/1993
(Continued)

OTHER PUBLICATIONS

"About Flickr"; bearing a date of 2006; pp. 1-2; located at http://www.flickr.com/about/.
(Continued)

*Primary Examiner* — Fan Tsang
*Assistant Examiner* — David Siegel

(57) ABSTRACT

In one aspect, a method related to data management includes but is not limited to accepting input for a designation of a reference designator in an audio data stream; accepting input for a designation of a beginning demarcation designator in the audio data stream; accepting input for a designation of an ending demarcation designator in the audio data stream; and accepting input for retaining at a high resolution a portion of the audio data stream beginning substantially at the beginning demarcation designator and ending substantially at the ending demarcation designator. In addition, other method, system, and program product aspects are described in the claims, drawings, and/or text forming a part of the present application.

30 Claims, 19 Drawing Sheets

(51) Int. Cl.

| | |
|---|---|
| *G11B 27/034* | (2006.01) |
| *G11B 27/22* | (2006.01) |
| *G11B 27/34* | (2006.01) |
| *H04N 21/233* | (2011.01) |
| *H04N 21/422* | (2011.01) |
| *H04N 21/439* | (2011.01) |
| *H04N 21/845* | (2011.01) |
| *G11B 27/00* | (2006.01) |
| *G11B 20/00* | (2006.01) |

(56) References Cited

U.S. PATENT DOCUMENTS

| | | |
|---|---|---|
| 4,763,146 A | 8/1988 | Niikura |
| 4,788,565 A | 11/1988 | Masuda et al. |
| 4,829,384 A | 5/1989 | Iida et al. |
| 4,862,280 A | 8/1989 | Iida et al. |
| 5,001,504 A | 3/1991 | Okada |
| 5,034,759 A | 7/1991 | Watson |
| 5,150,215 A | 9/1992 | Shi |
| 5,164,831 A | 11/1992 | Kuchta et al. |
| 5,341,192 A | 8/1994 | Wally, Jr. et al. |
| 5,410,343 A | 4/1995 | Coddington et al. |
| 5,485,553 A | 1/1996 | Kovalick et al. |
| 5,485,554 A | 1/1996 | Lowitz et al. |
| 5,588,029 A | 12/1996 | Maturi et al. |
| 5,612,715 A | 3/1997 | Karaki et al. |
| 5,629,778 A | 5/1997 | Reuman |
| 5,655,144 A | 8/1997 | Milne et al. |
| 5,689,343 A | 11/1997 | Loce et al. |
| 5,689,442 A | 11/1997 | Swanson et al. |
| 5,701,163 A | 12/1997 | Richards et al. |
| 5,751,338 A | 5/1998 | Ludwig, Jr. |
| 5,764,800 A | 6/1998 | Yamagata |
| 5,796,879 A | 8/1998 | Wong et al. |
| 5,825,506 A | 10/1998 | Bednar et al. |
| 5,852,753 A | 12/1998 | Lo et al. |
| 5,889,895 A | 3/1999 | Wong et al. |
| 5,892,509 A | 4/1999 | Jakobs et al. |
| 5,915,135 A | 6/1999 | Fiorentini |
| 5,917,958 A | 6/1999 | Nunally et al. |
| 5,917,962 A | 6/1999 | Chen et al. |
| 5,956,081 A | 9/1999 | Katz et al. |
| 5,995,095 A | 11/1999 | Ratakonda |
| 6,021,403 A | 2/2000 | Horvitz et al. |
| 6,028,585 A | 2/2000 | Ishii et al. |
| 6,115,341 A | 9/2000 | Hirai |
| 6,122,003 A | 9/2000 | Anderson |
| 6,134,345 A | 10/2000 | Berman et al. |
| 6,188,383 B1 | 2/2001 | Tamura |
| 6,198,526 B1 | 3/2001 | Ohtsuka |
| 6,222,465 B1 | 4/2001 | Kumar et al. |
| 6,275,260 B1 | 8/2001 | Anderson |
| 6,282,377 B1 | 8/2001 | Lawther et al. |
| 6,285,794 B1 | 9/2001 | Georgiev et al. |
| 6,332,666 B1 | 12/2001 | Ikeda |
| 6,333,792 B1 | 12/2001 | Kimura |
| 6,366,577 B1 | 4/2002 | Donovan |
| 6,384,862 B1 | 5/2002 | Brusewitz et al. |
| 6,400,848 B1 | 6/2002 | Gallagher |
| 6,411,742 B1 | 6/2002 | Peterson |
| 6,446,095 B1 | 9/2002 | Mukai |
| 6,452,974 B1 | 9/2002 | Menon et al. |
| 6,456,339 B1 | 9/2002 | Surati et al. |
| 6,493,028 B1 | 12/2002 | Anderson et al. |
| 6,509,931 B1 | 1/2003 | Mizosoe et al. |
| 6,512,541 B2 | 1/2003 | Dunton et al. |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,535,228 B1 | 3/2003 | Bandaru et al. |
| 6,539,169 B1 | 3/2003 | Tsubaki et al. |
| 6,542,183 B1 | 4/2003 | DeAngelis et al. |
| 6,567,122 B1 | 5/2003 | Anderson et al. |
| 6,573,927 B2 | 6/2003 | Parulski et al. |
| 6,577,311 B1 | 6/2003 | Crosby et al. |
| 6,577,336 B1 | 6/2003 | Safai |
| 6,587,602 B2 | 7/2003 | Wakisawa et al. |
| 6,611,293 B2 | 8/2003 | Tarnoff et al. |
| 6,650,366 B2 | 11/2003 | Parulski et al. |
| 6,650,704 B1 | 11/2003 | Carlson et al. |
| 6,654,543 B2 | 11/2003 | Ando et al. |
| 6,657,667 B1 | 12/2003 | Anderson |
| 6,678,413 B1 | 1/2004 | Liang et al. |
| 6,680,748 B1 | 1/2004 | Monti |
| 6,687,877 B1 | 2/2004 | Sastry et al. |
| 6,698,021 B1 | 2/2004 | Amini et al. |
| 6,701,845 B2 | 3/2004 | Ohmura |
| 6,710,809 B1 | 3/2004 | Niikawa |
| 6,714,192 B1 | 3/2004 | Torres |
| 6,735,253 B1 | 5/2004 | Chang et al. |
| 6,738,155 B1 | 5/2004 | Rosenlund et al. |
| 6,757,008 B1 | 6/2004 | Smith |
| 6,757,431 B2 | 6/2004 | Loce et al. |
| 6,757,480 B1 | 6/2004 | Moon et al. |
| 6,762,791 B1 | 7/2004 | Schuetzle |
| 6,801,719 B1 | 10/2004 | Szajewski et al. |
| 6,816,071 B2 | 11/2004 | Conti |
| 6,822,660 B2 | 11/2004 | Kim |
| 6,823,092 B1 | 11/2004 | Sato |
| 6,832,009 B1 | 12/2004 | Shezaf et al. |
| 6,885,395 B1 | 4/2005 | Rabbani et al. |
| 6,898,173 B2 | 5/2005 | McPherson et al. |
| 6,961,083 B2 | 11/2005 | Obrador et al. |
| 6,967,780 B2 | 11/2005 | Hillis et al. |
| 6,987,528 B1 | 1/2006 | Nagahisa et al. |
| 6,999,626 B2 | 2/2006 | Andrew |
| 7,015,949 B1 | 3/2006 | Sah |
| 7,015,954 B1 | 3/2006 | Foote et al. |
| 7,068,316 B1 | 6/2006 | Pine |
| 7,075,567 B2 | 7/2006 | Hunter et al. |
| 7,079,176 B1 | 7/2006 | Freeman et al. |
| 7,196,317 B1 | 3/2007 | Meissner, II et al. |
| 7,227,569 B2 | 6/2007 | Maruya |
| 7,257,317 B2 | 8/2007 | Ohnishi |
| 7,292,229 B2 * | 11/2007 | Morag et al. ............... 345/173 |
| 7,333,134 B2 | 2/2008 | Miyamoto |
| 7,339,623 B2 | 3/2008 | Kawai |
| 7,340,766 B2 | 3/2008 | Nagao et al. |
| 7,362,968 B2 | 4/2008 | Kim |
| 7,782,365 B2 | 8/2010 | Levien et al. |
| 7,924,324 B2 | 4/2011 | Fujita |
| 8,026,944 B1 | 9/2011 | Sah |
| 8,072,501 B2 | 12/2011 | Jung et al. |
| 8,233,042 B2 | 7/2012 | Jung et al. |
| 8,253,821 B2 | 8/2012 | Jung et al. |
| 2001/0028398 A1 | 10/2001 | Takahashi |
| 2001/0029521 A1 | 10/2001 | Matsuda et al. |
| 2001/0030709 A1 | 10/2001 | Tarnoff et al. |
| 2001/0033333 A1 | 10/2001 | Suzuki et al. |
| 2001/0042043 A1 | 11/2001 | Shear et al. |
| 2001/0046199 A1 | 11/2001 | McPherson et al. |
| 2002/0012071 A1 | 1/2002 | Sun |
| 2002/0028060 A1 * | 3/2002 | Murata et al. ............... 386/52 |
| 2002/0030749 A1 | 3/2002 | Nakamura et al. |
| 2002/0054232 A1 | 5/2002 | Inagaki |
| 2002/0069036 A1 | 6/2002 | Mizokawa |
| 2002/0171737 A1 | 11/2002 | Tullis |
| 2002/0176016 A1 | 11/2002 | Misawa et al. |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0037111 A1 | 2/2003 | Yoshioka |
| 2003/0069898 A1 | 4/2003 | Christodoulou et al. |
| 2003/0070174 A1 | 4/2003 | Solomon |
| 2003/0072491 A1 | 4/2003 | Sirivara et al. |
| 2003/0081140 A1 | 5/2003 | Furukawa |
| 2003/0103144 A1 | 6/2003 | Sesek et al. |
| 2003/0112354 A1 | 6/2003 | Ortiz et al. |
| 2003/0113014 A1 | 6/2003 | Katoh |
| 2003/0117642 A1 | 6/2003 | Haraguchi |

(56) References Cited

U.S. PATENT DOCUMENTS

| | | |
|---|---|---|
| 2003/0131002 A1 | 7/2003 | Gennetten et al. |
| 2003/0152263 A1 | 8/2003 | Kawano et al. |
| 2003/0160870 A1 | 8/2003 | Ziemkowski |
| 2003/0206232 A1 | 11/2003 | Suzuki et al. |
| 2003/0222998 A1 | 12/2003 | Yamauchi et al. |
| 2003/0227560 A1 | 12/2003 | Mattsson et al. |
| 2003/0234953 A1 | 12/2003 | Dawson et al. |
| 2003/0236674 A1 | 12/2003 | Henry, Jr. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0017333 A1 | 1/2004 | Cooper et al. |
| 2004/0032517 A1 | 2/2004 | Walmsley et al. |
| 2004/0037540 A1 | 2/2004 | Frohlich et al. |
| 2004/0042679 A1 | 3/2004 | Yamada |
| 2004/0046885 A1 | 3/2004 | Regan et al. |
| 2004/0066968 A1 | 4/2004 | Glickman |
| 2004/0070586 A1 | 4/2004 | Taubin |
| 2004/0070678 A1 | 4/2004 | Toyama et al. |
| 2004/0071445 A1 | 4/2004 | Tarnoff et al. |
| 2004/0075750 A1 | 4/2004 | Bateman |
| 2004/0080537 A1 | 4/2004 | Adler |
| 2004/0085456 A1 | 5/2004 | Kwag et al. |
| 2004/0095474 A1 | 5/2004 | Matsufune |
| 2004/0120562 A1 | 6/2004 | Hays et al. |
| 2004/0123131 A1 | 6/2004 | Zacks et al. |
| 2004/0145501 A1 | 7/2004 | Hung |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0179545 A1 | 9/2004 | Erola et al. |
| 2004/0183903 A1 | 9/2004 | Pedersen |
| 2004/0187583 A1 | 9/2004 | Ogawa |
| 2004/0201690 A1 | 10/2004 | Bryant et al. |
| 2004/0201709 A1 | 10/2004 | McIntyre et al. |
| 2004/0201748 A1 | 10/2004 | Goldstein et al. |
| 2004/0216173 A1 | 10/2004 | Horoszowski et al. |
| 2004/0218894 A1 | 11/2004 | Harville et al. |
| 2004/0233308 A1 | 11/2004 | Elliott et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0252230 A1 | 12/2004 | Winder |
| 2004/0257462 A1 | 12/2004 | Goris et al. |
| 2004/0263658 A1 | 12/2004 | Cozier et al. |
| 2005/0007471 A1 | 1/2005 | Walmsley et al. |
| 2005/0013602 A1 | 1/2005 | Ogawa |
| 2005/0018053 A1 | 1/2005 | Suga et al. |
| 2005/0036033 A1 | 2/2005 | Imai |
| 2005/0050043 A1 | 3/2005 | Pyhalammi et al. |
| 2005/0084037 A1 | 4/2005 | Liang |
| 2005/0103863 A1 | 5/2005 | Zhu et al. |
| 2005/0113136 A1 | 5/2005 | Gosieski, Jr. |
| 2005/0130717 A1 | 6/2005 | Gosieski, Jr. et al. |
| 2005/0150362 A1 | 7/2005 | Uehara |
| 2005/0158015 A1 | 7/2005 | Nakayama et al. |
| 2005/0185062 A1 | 8/2005 | Hillis et al. |
| 2005/0187901 A1 | 8/2005 | Maritzen et al. |
| 2005/0193421 A1 | 9/2005 | Cragun |
| 2005/0207487 A1 | 9/2005 | Monroe |
| 2005/0212950 A1 | 9/2005 | Kanai |
| 2005/0231625 A1 | 10/2005 | Parulski et al. |
| 2005/0262097 A1 | 11/2005 | Sim-Tang et al. |
| 2006/0008254 A1 | 1/2006 | Seo |
| 2006/0023066 A1 | 2/2006 | Li et al. |
| 2006/0034533 A1 | 2/2006 | Batchvarov |
| 2006/0044398 A1 | 3/2006 | Foong et al. |
| 2006/0044416 A1 | 3/2006 | Miyazaki et al. |
| 2006/0048057 A1 | 3/2006 | Herberger et al. |
| 2006/0050785 A1 | 3/2006 | Watanabe et al. |
| 2006/0056326 A1 | 3/2006 | Croome |
| 2006/0072837 A1 | 4/2006 | Ralston et al. |
| 2006/0085534 A1 | 4/2006 | Ralston et al. |
| 2006/0098112 A1 | 5/2006 | Kelly |
| 2006/0109349 A1 | 5/2006 | Takashima |
| 2006/0125922 A1 | 6/2006 | Albert et al. |
| 2006/0143665 A1 | 6/2006 | Meek et al. |
| 2006/0170956 A1 | 8/2006 | Jung et al. |
| 2006/0171603 A1 | 8/2006 | Jung et al. |
| 2006/0173972 A1 | 8/2006 | Jung et al. |
| 2006/0174203 A1 | 8/2006 | Jung et al. |
| 2006/0174204 A1 | 8/2006 | Jung et al. |
| 2006/0174206 A1 | 8/2006 | Jung et al. |
| 2006/0176392 A1 | 8/2006 | Rainier et al. |
| 2006/0177150 A1 | 8/2006 | Uyttendaele et al. |
| 2006/0187227 A1 | 8/2006 | Jung et al. |
| 2006/0187228 A1 | 8/2006 | Jung et al. |
| 2006/0187230 A1 | 8/2006 | Jung et al. |
| 2006/0190968 A1 | 8/2006 | Jung et al. |
| 2006/0221197 A1 | 10/2006 | Jung et al. |
| 2006/0226298 A1 | 10/2006 | Pierson |
| 2006/0274154 A1 | 12/2006 | Levien et al. |
| 2006/0274165 A1 | 12/2006 | Levien et al. |
| 2006/0285150 A1 | 12/2006 | Jung et al. |
| 2007/0008326 A1 | 1/2007 | Levien et al. |
| 2007/0040928 A1 | 2/2007 | Jung et al. |
| 2007/0052856 A1 | 3/2007 | Jung et al. |
| 2007/0097214 A1 | 5/2007 | Jung et al. |
| 2007/0098348 A1 | 5/2007 | Jung et al. |
| 2007/0100533 A1 | 5/2007 | Jung et al. |
| 2007/0100606 A1* | 5/2007 | Rogers .......................... 704/205 |
| 2007/0100621 A1 | 5/2007 | Jung et al. |
| 2007/0109411 A1 | 5/2007 | Jung et al. |
| 2007/0120980 A1 | 5/2007 | Jung et al. |
| 2007/0120981 A1 | 5/2007 | Levien et al. |
| 2007/0139529 A1 | 6/2007 | Levien et al. |
| 2007/0200934 A1 | 8/2007 | Jung et al. |
| 2007/0222865 A1 | 9/2007 | Levien et al. |
| 2007/0236505 A1 | 10/2007 | Jung et al. |
| 2007/0238151 A1 | 10/2007 | Jung et al. |
| 2007/0274563 A1 | 11/2007 | Jung et al. |
| 2008/0043108 A1 | 2/2008 | Jung et al. |
| 2008/0298796 A1 | 12/2008 | Kuberka et al. |
| 2009/0027505 A1 | 1/2009 | Jung et al. |
| 2009/0027546 A1 | 1/2009 | Jung et al. |
| 2009/0073268 A1 | 3/2009 | Jung et al. |
| 2010/0017289 A1 | 1/2010 | Sah et al. |
| 2011/0270916 A1 | 11/2011 | Shih et al. |
| 2012/0105716 A1 | 5/2012 | Jung et al. |

FOREIGN PATENT DOCUMENTS

| | | |
|---|---|---|
| JP | H09-018762 | 1/1997 |
| JP | 2001086383 | 3/2001 |
| JP | 2001-309236 A | 11/2001 |
| JP | 2002-094862 A | 3/2002 |
| JP | 2003-009044 A | 1/2003 |
| WO | WO 2005/045807 A1 | 5/2005 |
| WO | WO 2005/078597 A1 | 8/2005 |

OTHER PUBLICATIONS

"About the SD Memory Card"; bearing a date of 2004; pp. 1-3; located at http://www.sdcard.org sd_memorycard/index.html; SD Card Association; printed on Mar. 7, 2006.

"Auto Exposure Bracketing (AEB Mode)"; PowerShot G2 Digital Camera; bearing a date of 2004; pp. 1-4; located at http://web.canon.jp/Imaging/PSG3/PSG3_129-e.html; Canon Inc., printed on Sep. 7, 2006.

"Digital Cameras Glossary", pp. 1-3; located at http://www.crutchfieldadvisor.com/ISEO-rgbtcspd/learningcenter/home/digitalcameras_glossary.html; printed on Mar. 8, 2006.

"Digital Cameras: How to Choose", pp. 1-3; located at http://www.crutchfieldadvisor.com/ISEO-rgbtcspd/learningcenter/home/digitalcameras.html; printed on Mar. 8, 2006.

"Fujifilm, Summus Collaborate to Provide Wireless Photo Services"; bearing a date of Feb. 18, 2004; pp. 1-2; located at http://phx.corporate-ir.net/phoenix.zhtml?c=131111&p=irol-newsArticle&ID=807972&highlight=; Oasys Mobile, Inc.; printed on Mar. 17, 2006.

(56) References Cited

OTHER PUBLICATIONS

"Kodak Unveils Worlds First Dual-Lens Digital Camera; Combines Ultra-Wide Angle and Zoom Lenses in Compact Body"; bearing a date of Jan. 2, 2006; pp. 1-2; Kodak; located at: http://www.kodak.com/cknee/PaseQuerierjhtml?pg-path=2709pg-locale=en_US&gpcid=0900688a80465805; printed on Mar. 7, 2006.

"Kodak's dual-lens camera"; bearing a date of Jan. 2, 2006; pp. 1; located at http://news.com/2300.com/2300-1041_3-6014914-2,htnl?tag=ne.gall.pg; c/net news.com; printed on Mar. 7, 2006.

"Leading Edge Eyecam Extreme High Resolution Wireless Color Video Camera System"; pp. 1-2; located at: http://parts.retoys.com/re-toys-hobbies/Items/329769%20-%20(S); Draganfly Parts Warehouse; printed on Mar. 9, 2006.

"Multi Camera Acquisition"; bearing a date of 2006; pp. 1; located at http://sine.ni.com/apps/we/niepd_web_display.display_epd4?p_guid?B45EACE3E80B56A4E034080020E74861&p_node=DZ52489&p_source=external; National Instruments Corporation; printed on Aug. 29, 2006.

2TIFF.COM; "Introduction to 2TIFF"; pp. 1-3; located at http://www.2tiff.com/help/;bearing a date of 2004; printed on Feb. 16, 2005.

About.com; "Image Size and Resolution"; pp. 1-3; located at http://graphicssoft.about.com/od/resolution/; bearing a date of 2005; printed on Feb. 16, 2005.

Adobe.com; "Share images with Photo Mail (Win only)"; pp. 1-4; located at http://www.adobe.com/tips/phsel3photomail/main.html; printed on Jan. 26, 2005.

Bockaert, Vincent; "Interpolation"; pp. 1-4; located at http://www.dpreview.com/learn/?/Glossary/Digital_Imaging/Interpolation_01.htm; bearing a date of 1998—2005; printed on Feb. 16, 2005.

Canon.ca; "Print/Share Button"; pp. 1-2; located at http://www.canon.ca/digitalphotgraphy/english/ctech_article.asp?id=174&tid=6; bearing a date of Jan. 26, 2005; printed on Jan. 26, 2005.

Cg.Its.Tudelft.Nl; Delft University of Technology; "Shared cameras"; pp. 1; located at http://www.eg.its.tudelft.nl/~spiff/descSC.html; printed on Jan. 27, 2005.

Chainstyle.com; "Resolution and Image Size"; pp. 1-9; located at http://www.chainstyle.com/photoshop/webhelp/tutorials/basics resolution_and_image_size:htm; printed on Feb. 16, 2005.

Chastain, Sue; "Q. Is it better to use in-camera digital zoom or crop and resample with software?"; pp. 1-2; located at http://graphicssoft.about.com/cs/digitalimaging/f/digitalzoom.htm; bearing a date of 2005; printed on Feb. 17, 2005.

Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.

CNNmoney; "Playboy coming to iPod"; pp. 1-2; located at http://money.cnn.com/2005/01/05/technology/personaltech/playboy_ipod/index.html;bearing a date of Jan. 5, 2005; printed on Jan. 26, 2005.

Co-Array.Org; "A Brief Overview of Co-Array Fortran"; pp. 1-3; located at http://www.co-array.org/caf_intro.htm; printed on May 3, 2005.

Colbert, Martin; Voglimacci, Catherine; Finkelstein, Anthony; Live, Audio-Visual Communication Systems for Distance Learning: Experience, Heuristics and ISDN; pp. 1-40.

Cummins, Fred; "Synchronization Among Speakers Reduces Macroscopic Temporal Variability"; pp. 1-6.

Darlin, Damon; "Why Do-It-Yourself Photo Printing Doesn't Add Up"; bearing a date of Oct. 8, 2005; pp. 1-3; located at http://www.nytimes.com/2005/10/08/technology 08photo.ready.html; The New York Times; printed on Aug. 28, 2006.

Dave; "How Many Pixels? A reasoned approach to digicam specifications"; pp. 1-5; located at http://www.imaging-resource.com/Arts/Howbig/Howbig.htm; bearing a date of 1999; printed on Feb. 16, 2005.

Debian.org; "GNUstep application for digital still cameras"; pp. 1-2; located at http://packages.debian.org/unstable/graphics/camera.app; bearing a date of Jan. 26, 2005; printed on Jan. 27, 2005.

Digital Photography Review; "Kodak EasyShare One"; pp. 1-5; located at http://www.dpreview.com/news/0501/05010605kodak easyshareone.asp; bearing a date of Jan. 6, 2005; printed on Jan. 26, 2005.

Dodd, George; "Music Performance Venues-keeping them in tune with modern requirements"; pp. 1-11.

Ekdahl, Lars; "Image Size and resolution"; pp. 1-5; located at http://www.ekdahl.org/kurs/resolution/resolution2_eng.htm; bearing a date of 2002; printed on Feb. 16, 2005.

El Saddik, Abdulmotaleb Dr.; "Multimedia Communications: Multimedia Technologies & Applications"; Multimedia Communications Research Laboratory, School of Information Technology and Engineering, University of Ottawa, Ottawa, Ontario, Canada; 22 slides; pp. 1-8.

Geocities.com; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.

Gizmodo.com; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.

Har-Peled, Sariel; Koltun, Vladlen; Song, Dezhen; Goldberg, Ken; CiteSeer.Ist:; "Efficient Algorithms for Shared Camera Control"; pp. 1-2; located at http://citeseer.ist.psu.edu/har-peled02efficient.html; bearing a date of 2002; printed on Jan. 26, 2005.

Hernandez, J.R.; Perez-Gonzalez, F.; Rodriguez, J.M.; "Coding and Synchronization: A Boost and a Bottleneck for the Development of Image Watermarking"; pp. 1-7; Dept. Tecnologias de las Communicaciones, ETSI Telecom., Universidad de Vigo, 36200 Vigo, Spain.

Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.

Home.iprimus.com.au; "Digital Cameras and Resampling"; pp. 1-2; located at http://home.iprimus.com.au/painless/resample.htm; printed on Feb. 16, 2005.

HP.com; "HP Image Zone Express step-by-step: HP Instant Share"; pp. 1-4; located at http://www.hp.com/united-states/ize/steps_instant_share.html; printed on Jan. 26, 2005.

Hua, Zhigang; Xie, Xing; Lu, Hanqing; Ma, Wei-Ying; Research. Microsoft.com; "COBO: Building Cooperative Environment for Cross-Device Image Sharing"; pp. 1; located at http://research.microsoft.com/research/pubs/view.aspx?type=technical+report&id=823; bearing a date of Nov. 2004; printed on Jan. 25, 2005.

Imaging Resource.com; "The Imaging Resource Quick Review"; pp. 1-22; located at http://www.imaging-resource.com/Prods/I700/I70A.htm; bearing a date of 2001; printed on Feb. 16, 2005.

Intel.com; "Instantly Capture and Share your World with an Intel® PC Camera"; pp. 1-2; located at http://www.intel.com/pccamera/; printed on Jan. 27, 2005.

Intel.com; "Intel® PC Cameras"; pp. 1-2; located at http://www.intel.com/pccamera/; printed on Jan. 27, 2005.

Jain, Anil K.; "Fundamentals of Digital Image Processing"; 1989; pp. 1-569; Prentice-Hall, Inc.; Englewood Cliffs, NJ U.S.A. [A copy of this publication is not included with this PTO-1449 (subst.)].

JVC Everio GZMG77 2.0MP CCD 30GB HDD Camcorder with 10x Optical Zoom; bearing a date of 1996-2006; pp. 1-8; located at http://www.amazon.com/gp/product/B000E1332W/ref=pd_cp_title/103-4351641-1963832; Amazon.com; printed on Apr. 25, 2006.

Kim, Jeong; Zimmerman, John; "Cherish: Smart Digital Photo Frames for Sharing Social Narratives at Home"; bearing a date of Apr. 22-28, 2006; pp. 1-6; located at http://www.cs.cmu.edu/~johnz/pubs/2006_CHI_cherish.pdf#search=%22cherish%3B%20smart%20digital%20photo%20frames%20for%20sharing%20social%20narratives%20at%20home%22.

Kodak.com; "Frequently Asked Questions"; pp. 1; located at http://www.kodak.com/global/en/service/knowledgebase/digital-camera-faqs.jhtml?pq-path=1396/5759; bearing a date of Jan. 6, 2005; printed on Jan. 26, 2005.

(56) References Cited

OTHER PUBLICATIONS

Koren, Norman; "Understanding image sharpness: Digital cameras vs. film, part 2"; pp. 1-16; located at http://www.normankoren.com/Tutorials/MTF7A.html; bearing a date of 2000-2004; printed on Feb. 3, 2005.
LTL Imagery; "About Resolution Understanding Digital Image Resolution"; pp. 1-10; located at http://www.ltlimagery.com/resolution.html; bearing a date of 2000-2004; printed on Feb. 16, 2005.
Lyons, Max; "Max Lyons Digital Image Gallery"; bearing a date of 2000-2005; pp. 1-3; located at http://www.tawbaware.com/maxlyons/; printed on Apr. 18, 2006.
Mahmoud, Qusay H.; "Getting Started with Data Synchronization Using SyncML"; pp. 1-6; located at http://developers.sun.com/techtopics/mobility/midp/articies/syncml/; bearing dates of Sep. 2004 and 1994-2005; printed on May 3, 2005.
Mills, Elinor; "HD camera, new monitor attract crowds"; bearing a date of 1995-2006; pp. 1; located at http://news.com.com/2102-7353_3-6023300.html?tag=st.util.print; c/net news.com; printed on Mar. 7, 2006.
Mobilemag; "Nikon D2H WiFi Digital Camera"; pp. 1-2; located at http://www.mobilmag.com/content/100/336/C2502/; bearing a date of Feb. 20, 2004; printed on Jan. 25, 2005.
National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000_us; bearing a date of 2005; printed on May 3, 2005.
PCT International Search Report; International App. No. PCT/US06/42699; dated Sep. 18, 2008; pp. 1-5.
PCT International Search Report; International App. No. PCT/US06/42841; dated Sep. 15, 2008; pp. 1-5.
PCT International Search Report; International App. No. PCT/US07/04934; dated Sep. 12, 2008; pp. 1-2.
National Instruments Corporation; "Genlocking Multiple JAI CV-M1 Cameras"; pp. 1-5; located at http://zone.ni.com/devzone/conceptd.nsf/webmain/7a6b5853548850e886256c21005b1413; bearing a date of 2005; printed on May 3, 2005.
National Instruments Corporation; "Multi-Camera Acquisition"; pp. 1-3; located at http://zone.ni. com/devzone/conceptd.nsf/webmain/D91BAC1317F9D0A686256C9300769A0D; bearing a date of 2005; printed on May 3, 2005.
"New High Capacity SD Memory Card Specification Under Final Review by SD Card Association"; bearing a date of Jan. 4, 2006; pp. 1-2; SD Card Association News Release.
Ng et al.; "Light Field Photography with a Hand-Held Plenoptic Camera"; bearing dates of 2004-2005; pp. 1-3; located at http://graphics.stanford.edu/papers/Ifcamera/;printed on Sep. 7, 2006.
Nicholls, Kyle; "Non-photorealistic Camera—Depth Edge Detection and Rendering using Muli-Flash Imaging"; bearing dates of 2000-2006; pp. 1-3; located at http://photo.net/learn/technology/mflash/merl-non-photo.html; printed on Apr. 18, 2006.
OkIP Video . . . Anywhere Solar Powered! Protecting Critical Government Infrastructure Military and Homeland Surveillance; pp. 1-8; located at http://www.oksolar.com/ip_anywhere/; printed on Mar. 9, 2006.
PCT International Search Report; International App. No. PCT/US06/42840; Sep. 26, 2007; pp. 1-2.
PCT International Search Report; International App. No. PCT/US06/42584; Sep. 28, 2007; pp. 1-2.
PCT International Search Report; International App. No. PCT/US07/08341; Feb. 7, 2008; pp. 1-2.
PCT International Search Report; International App. No. PCT/US07/08342; Feb. 7, 2008; pp. 1-2.
PCT International Search Report; International App. No. PCT/US06/42734; Mar. 26, 2008; pp. 1-2.
PCT International Search Report; International App. No. PCT/US06/42728; Jul. 7, 2008; pp. 1-2.
PCT International Search Report; International App. No. PCT/US06/23048; Jul. 18, 2008; pp. 1-2.
Physorg.com; "World's First Built-In Wi-Fi-Enabled Digital Cameras"; pp. 1-3; located at http://www.physorg.com/news6183.html; bearing a date of Sep. 2, 2005; printed on Sep. 7, 2005.
Rains, Nick; "Vietnam Travel Photography the Digital Way"; pp. 1-7; located at http://www.luminous-landscape.com/locations/vietnam.shtml; bearing a date of 2003; printed on Feb. 3, 2005.
Raymond, Emily; "Kodak Digital Cameras: Kodak EasyShare V570 Digital Camera Review"; pp. 1-2; bearing a date of Jan. 22, 2006; located at http://www.digitalcamerainfo.com/content/Kodak-EasyShare-V570; printed on Apr. 19, 2006.
Reichmann, Mchael; "Understanding Raw Files"; Luminous-landscape.com; pp. 1-9; located at http://www.luminous-landscape.com/tutorials/understanding-series/u-raw-files.shtml; printed on Oct. 25, 2005.
Ritzcamera.com; "Canon—Powershot A85 Digital Camera"; pp. 1-8; located at http://www.ritzcamera.com/webapp/wcs/stores/servlet/ProductDisplay?storeId=10001&catalogId=10001&langId=1&productId=13176854; printed on Jan. 26, 2005.
Roadcasting.org; "A new type of radio"; "Final Design"; "Process"; "Conclusions"; "Recognition"; "How Roadcasting Works"; "Download"; pp. 1-15; located at www.roadcasting.org; printed on Jun. 2, 2005.
Ross, Suzanne; Research.Microsoft.com; "The Life of a Digital Photo"; pp. 1-5; located at http://research.microsoft.com/displayArticle.aspx?id=6005; printed on Jan. 25, 2005.
"Sanyo Xacti VPC-HD1 5.1MP MPEG4 High Definition Camcorder x/10x Optical Zoom: Product Description"; bearing dates of 1996-2006; pp. 1-5; located at: http://www.amazon.com/gp/product-description/B000E0E6YC/ref=dp_nav_2/002-0210595-1654445?%5Fencoding=UTF8&n=502394&s=photo; Amazon.com; printed on Mar. 7, 2006.
Sciannamea, Michael; "WiFi-Enabled Digital Cameras About to Tap a Growing Marketplace"; pp. 1-5; located at http://wifi.weblogsinc.com/entry/7312187118786387/; bearing a date of Oct. 12, 2004; printed on Jan. 25, 2004.
"Secure Digital Card"; Wikipedia, pp. 1-6; located at http://en.wikipedia.org/wiki/Secure_Digital; Wikipedia; printed on Mar. 7, 2006.
Seifert, Eric; Eligator, Ron; "Acoustical Design Considerations at Universal Studios CityWalk™, Orlando, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.
Sellen, Abigail; Fleck, Rowanne; Kindberg, Tim; Spasojevic, Mirjana; Research.Microsoft.com; "How and Why People Use Camera Phones"; pp. 1-16; located at http://research.microsoft.com/research/pubs/view.aspx?type=technical+report&id=823 bearing a date of Nov. 2004; printed on Jan. 25, 2005.
Skillings, Jonathan; "Kodak packs two lenses in latest camera"; bearing a date of Feb. 7, 2006; pp. 1; located at http://news.com.com/2102-1041_3-6014939.html?tag=st.util.print; c/net news.com; printed on Mar. 7, 2006.
"Sony DCR-DVD405 3MP DVD Handycam Camcorder with 10x Optical Zoom"; pp. 1-12; Amazon.com; located at: http://www.amazon.com/gp/product/B000E0DU7G/ref=pd_cp_title/103-4351641-196383; printed on Apr. 25, 2006.
"SOUNDaround: Get cinema quality surround sound through two speakers"; RAM: SOUNDaround by Xitel; pp. 1-7; located at http://www.ramelectronics.net/html/soundaround.html; printed on Jul. 20, 2005.
Starbursthomepage.com; "Life is all about Sharing"; p. 1; located at http://www.starbursthomepage.com/flashpointx.htm; printed on Jan. 29, 2005.
Starbursthomepage.com; "Sharing-On-The-Go Technology"; pp. 1-3; located at http://www.starbursthomepage.com/fsotg.htm; printed on Jun. 29, 2005.
Starbursthomepage.com; "Specifications and Data Transfer Information"; pp. 1-5; located at http://www.starbursthomepage.com/fspec.htm; printed on Jun. 29, 2005.
Starbursthomepage.com; "What are FlashPoint ShareDrives"; pp. 1-4; located at http://www.starbursthomepage.com/fproducts.htm; printed on Jun. 29, 2005.

(56) References Cited

OTHER PUBLICATIONS

"storage device-A Word Definition From the Webopedia Computer Dictionary"; bearing dates of Oct. 30, 2001 and 2005; pp. 1-4; located at http://www.webodpedia.com/Terms/storage_device.htm; Webopedia.com; printed on Oct. 25, 2005.

Sutherland, Ed; "CSR Intros Low-Cost, Single-Chip WiFi"; pp. 1-3; located at http://www.wi-fiplanet.com/news/article.php/3434131; bearing a date of Nov. 10, 2004; printed on Jan. 25, 2005.

Swgc.mun.ca; "About image size and resolution"; pp. 1-7; located at http://www.swgc.mun.ca/vart2600/resolution.html;printed on Feb. 16, 2005.

"VisualStream: Digital Multimedia USB 1.1 High Resolution PC Camera"; bearing a date of 2002; pp. 1-4; D-Link Systems, Inc.; Irvine, CA.

"What is Flickr?"; bearing a date of 2006; pp. 1-6; located at http://www.flickr.com/learn_more.gne; printed on Aug. 28, 2006.

Woodrow, E.; Heinzelman, W.; "Spin-It: a data centric routing protocol for image retrieval in wireless networks"; bearing dates of Jun. 24-28, 2002; pp. 1-5; Image Processing 2002, Proceedings. 2002 International Conference; vol. 3; pp. 913-916; located at http://ieeexplore.ieee.org/xpl/absprintf.jsp?arnumber=1039121&pag; printed Mar. 19, 2006

"Yamaha Internet 'MidLive vol. 3': An Open Experiment: The First MidLive to Feature Synchronized Streaming of MIDI and Audio Data"; Yamaha News Release: wMid Live vol.3x; pp. 1-5; located at http://www.yamaha.co.jp/english/news/97121101.html; bearing a date of Dec. 1997; printed on Jul. 19, 2005.

\* cited by examiner

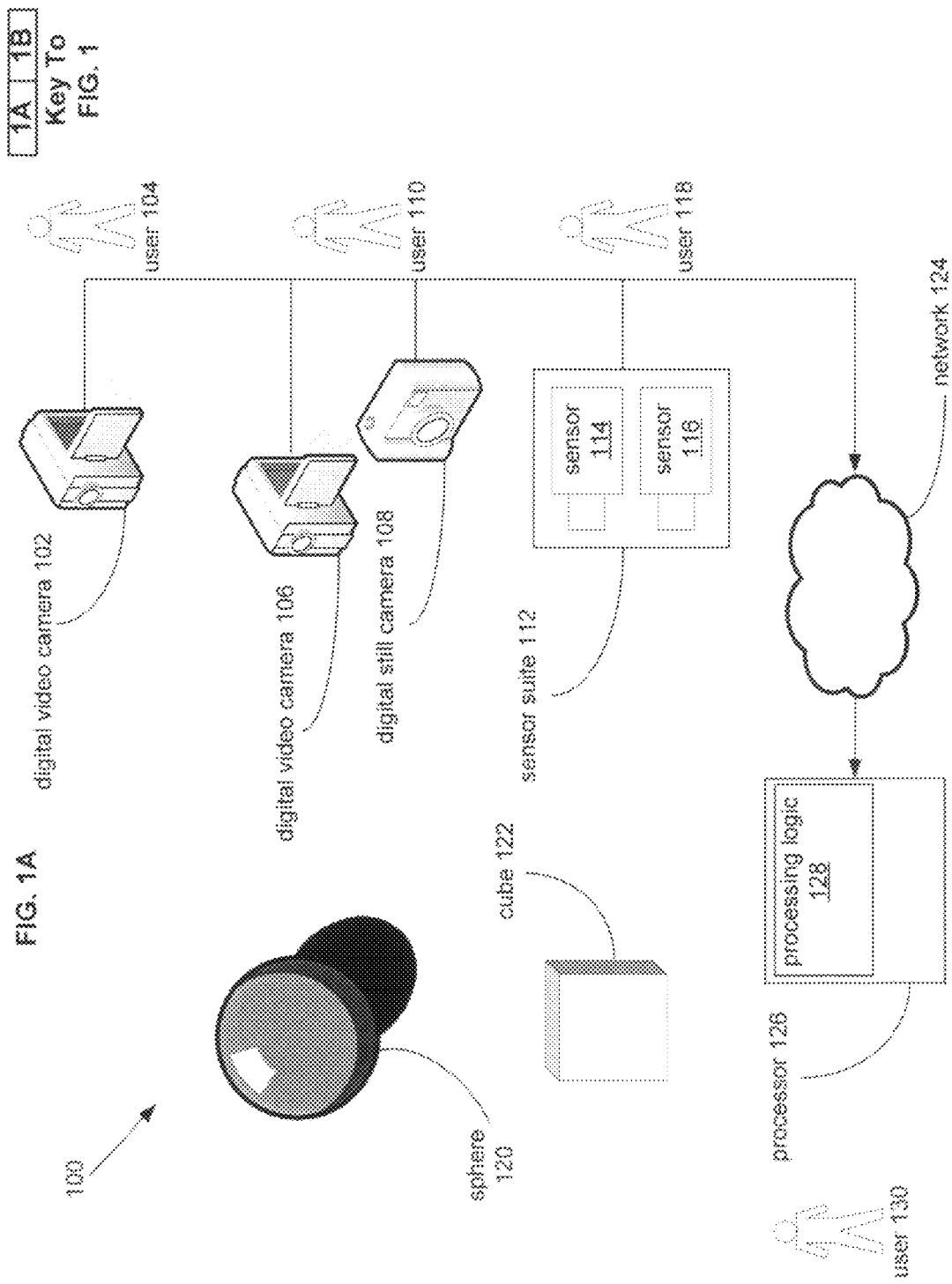

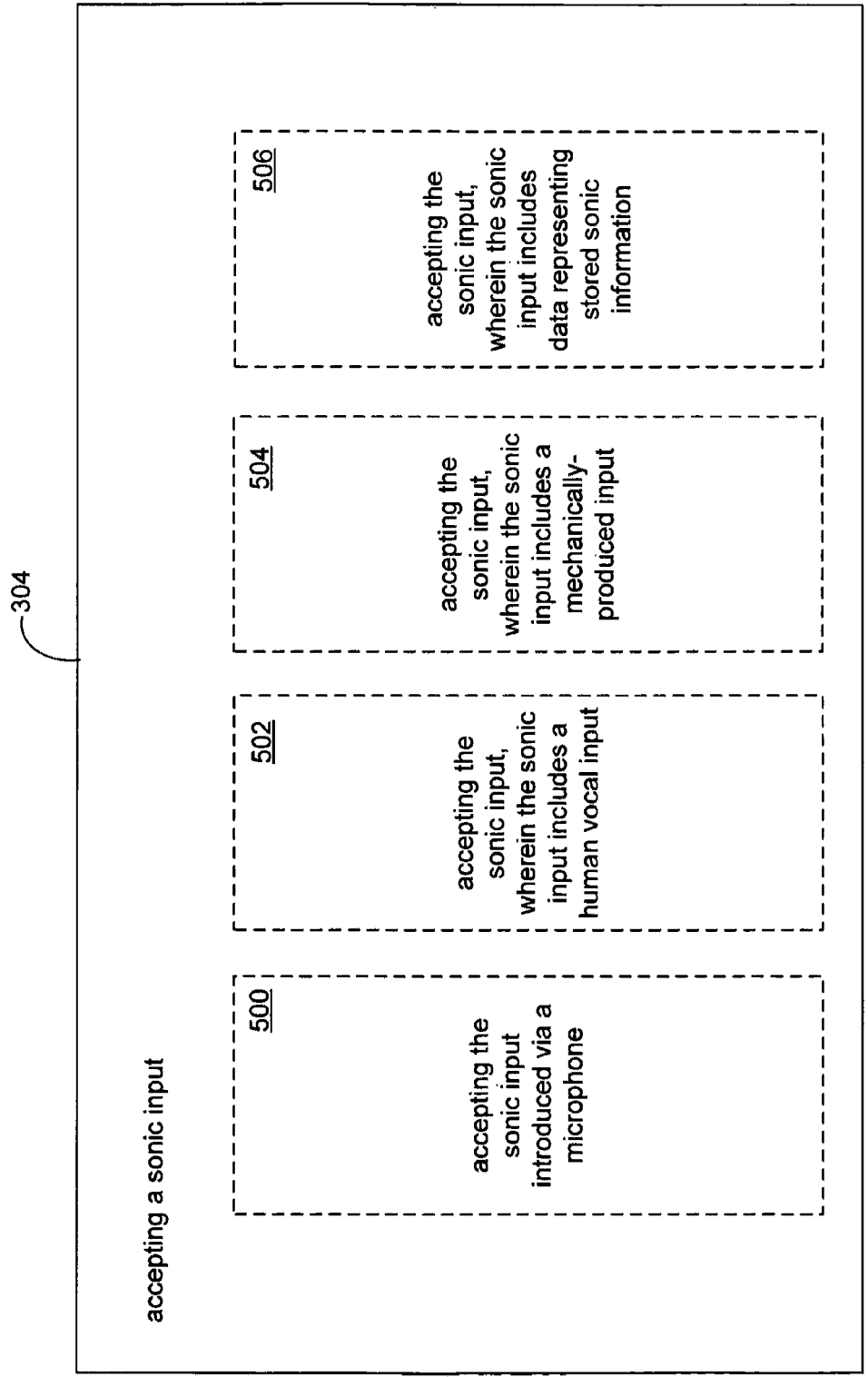

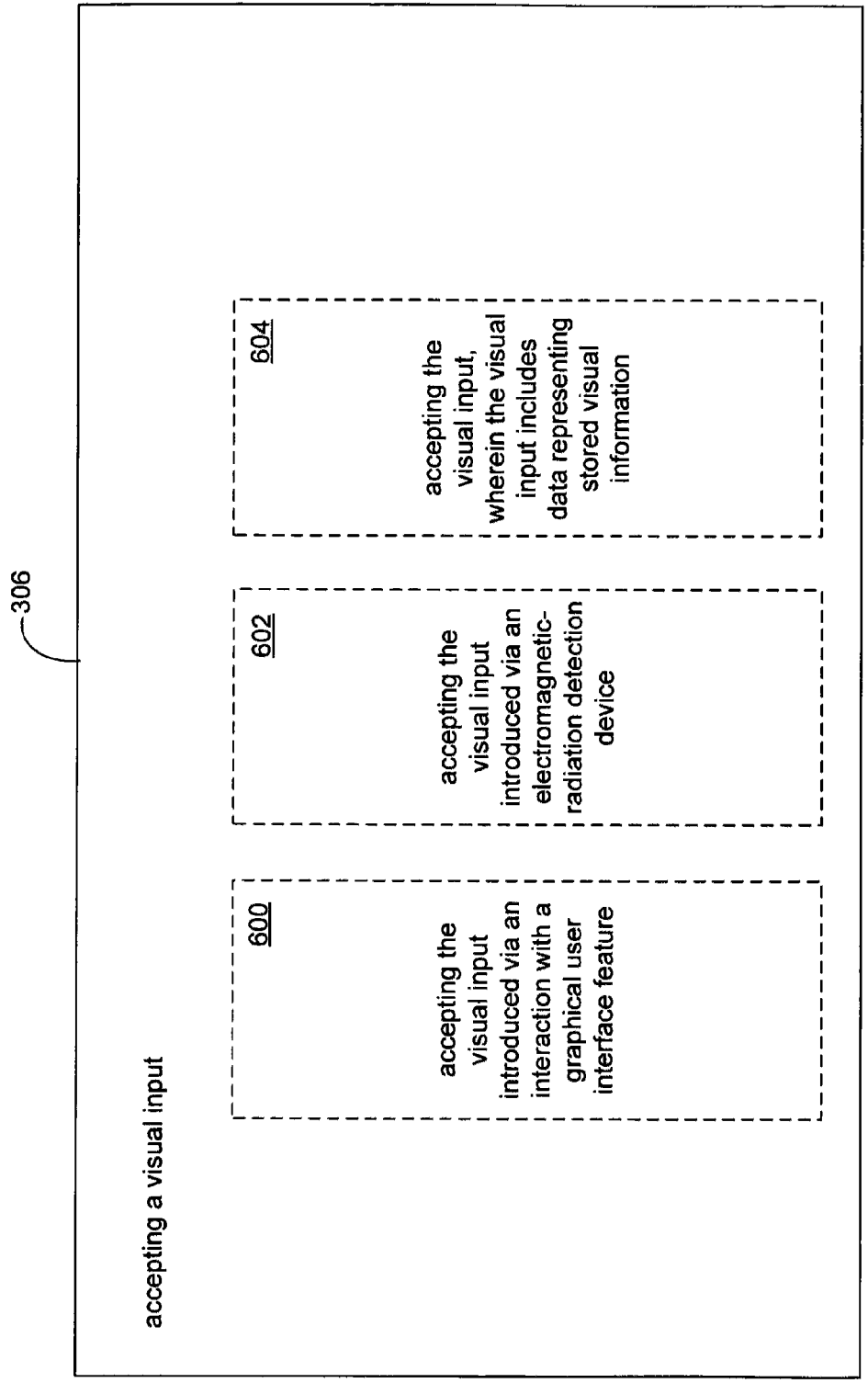

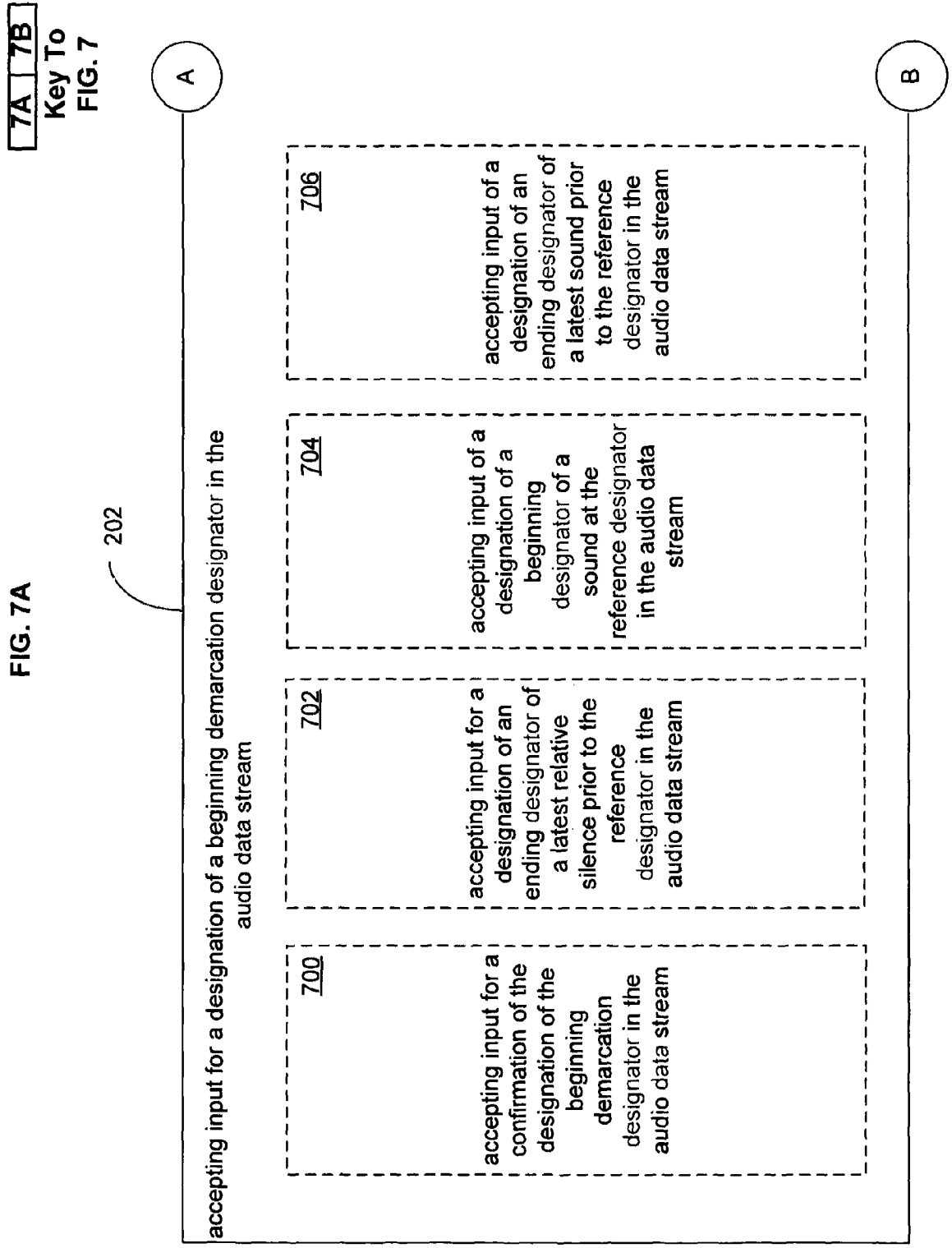

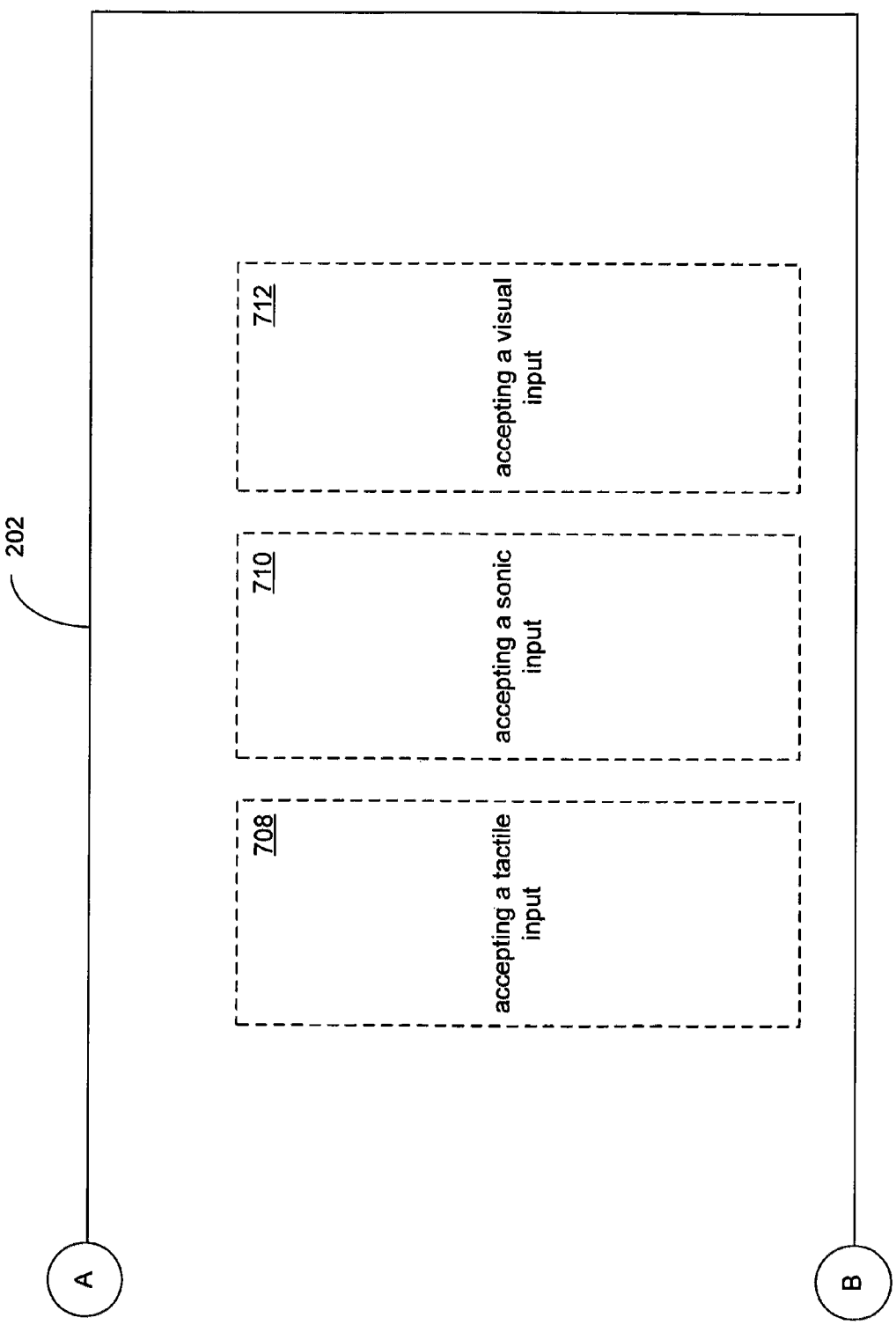

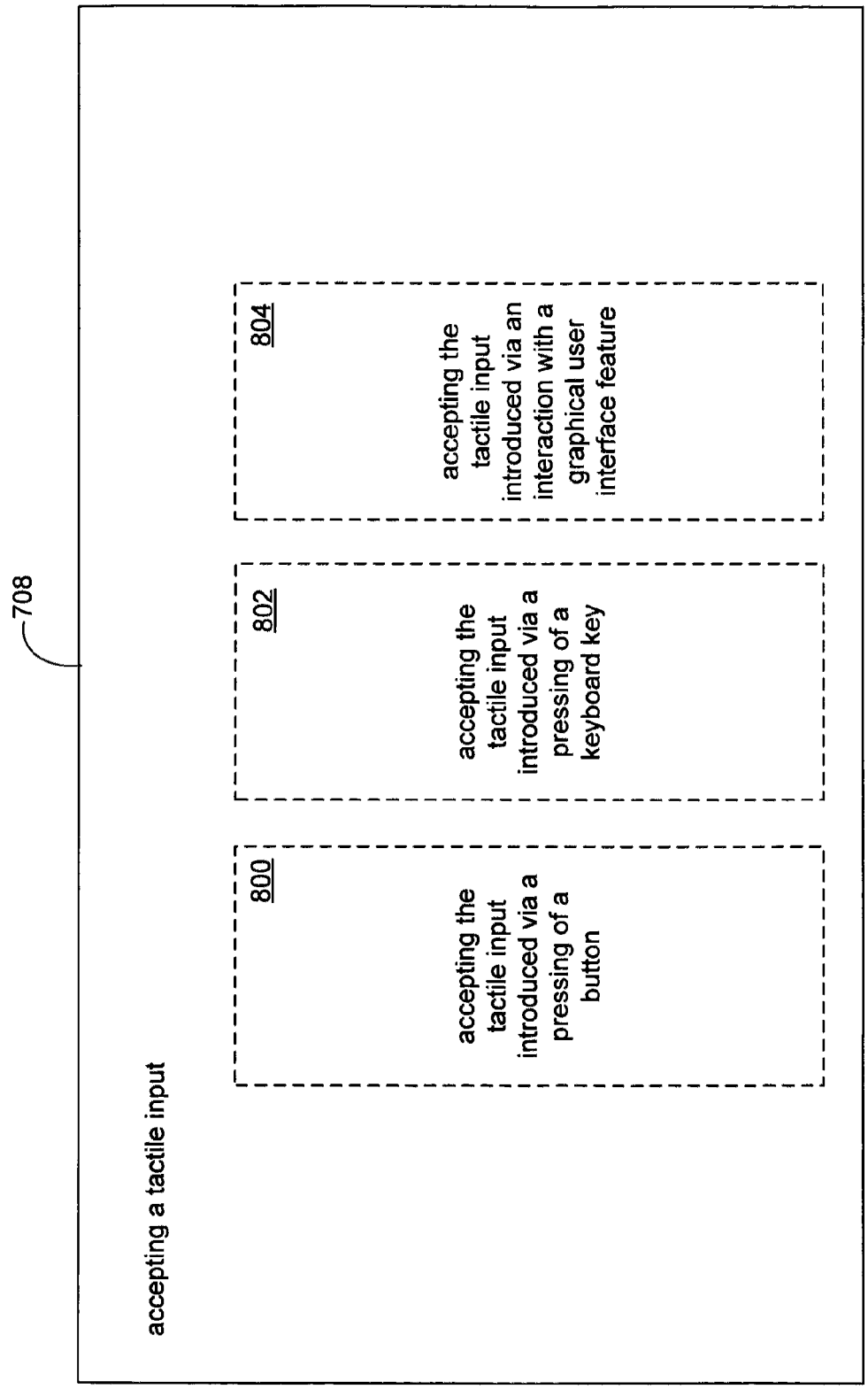

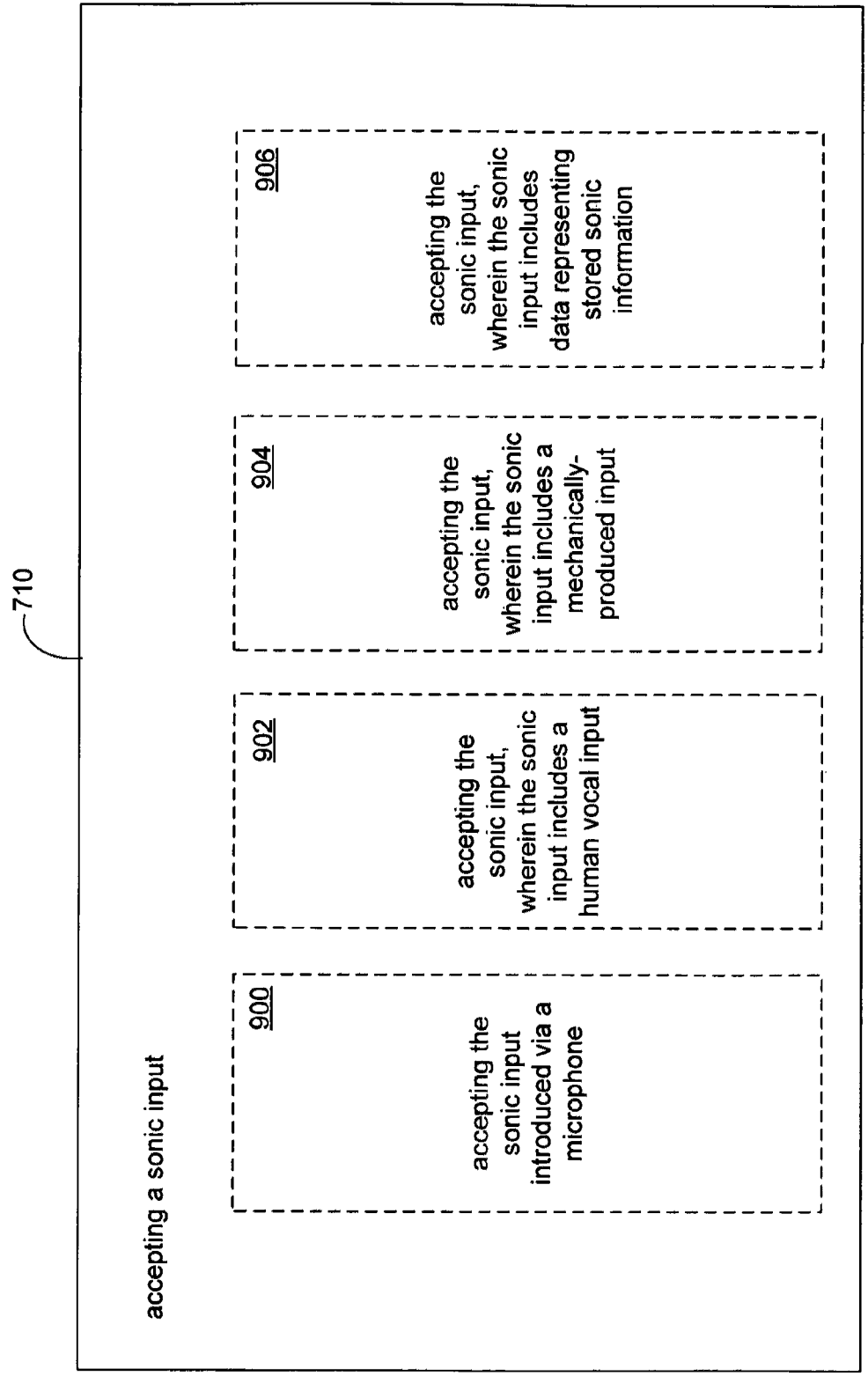

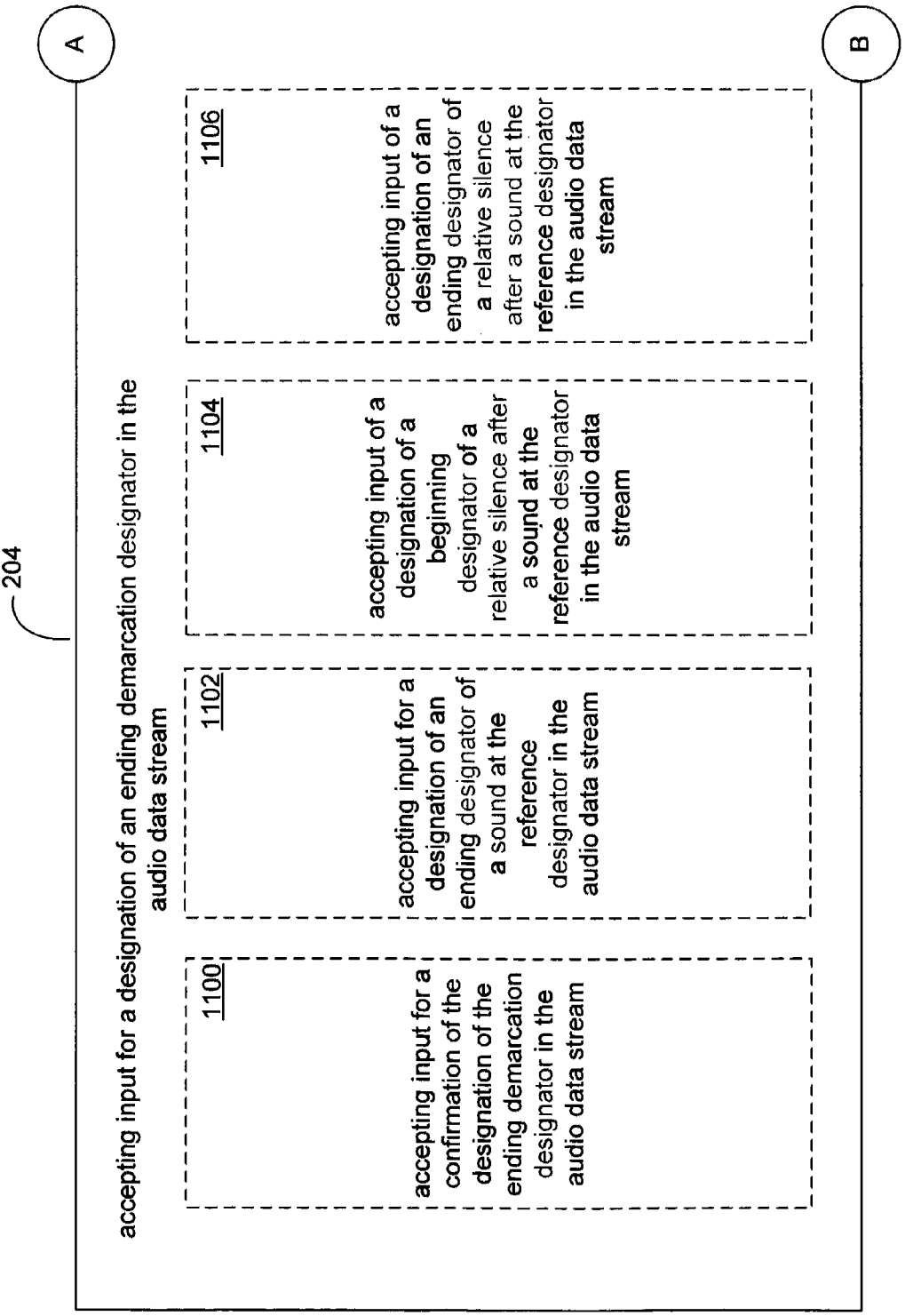

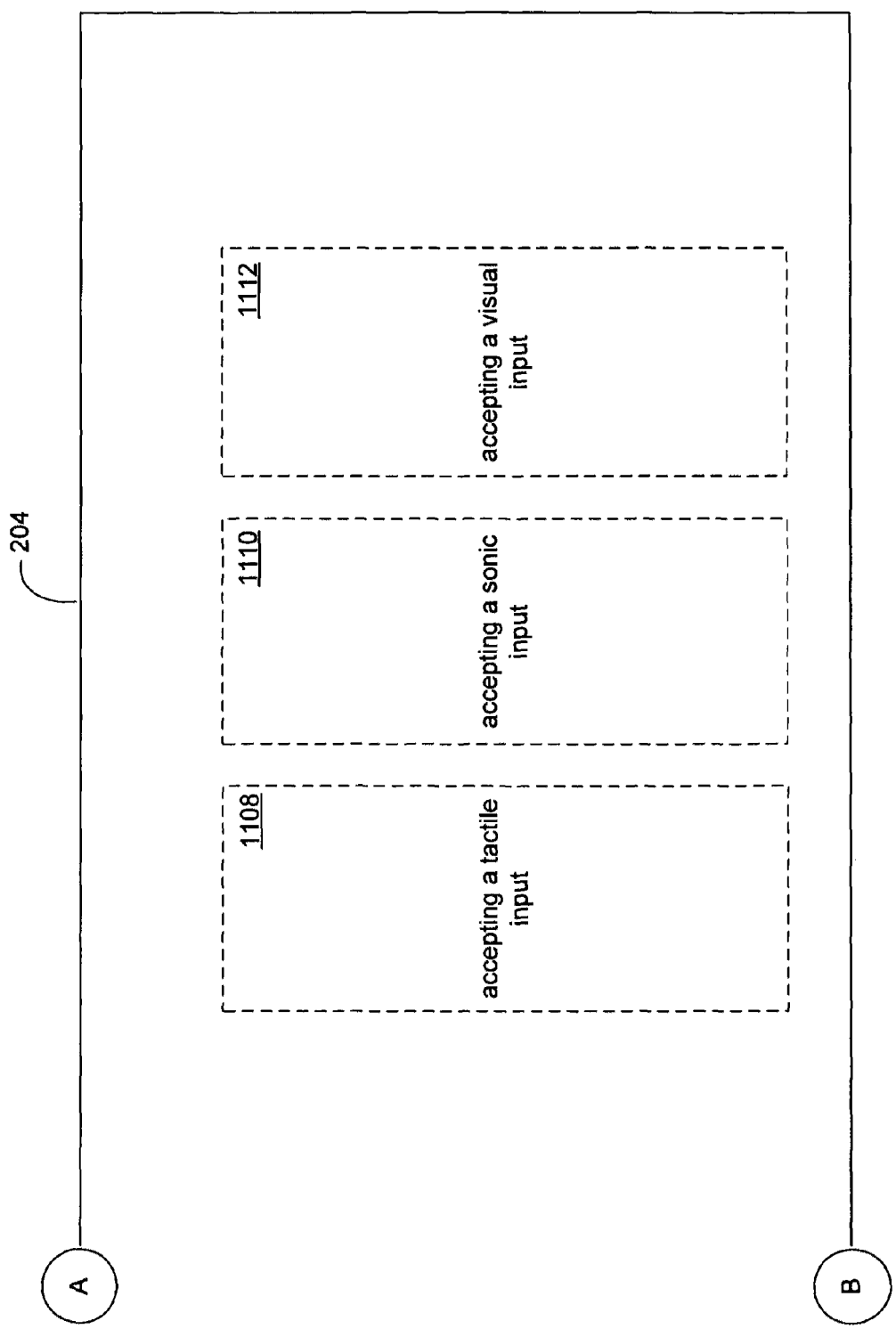

DATA MANAGEMENT OF AN AUDIO DATA STREAM

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation of U.S. patent application Ser. No. 11/396,279, entitled Data Management of an Audio Data Stream, naming Edward K.Y. Jung; Royce A. Levien; Robert W. Lord; Mark A. Malamud; and John D. Rinaldo, Jr. as inventors, filed Mar. 31, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/364,496, entitled Imagery Processing, naming Edward K. Y. Jung, Royce A. Levien, Robert W. Lord, Mark A. Malamud, and John D. Rinaldo, Jr., as inventors, filed Feb. 28, 2006, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/376,627, entitled Data Management of a Data Stream, naming Edward K. Y. Jung, Royce A. Levien, Robert W. Lord, Mark A. Malamud, and John D. Rinaldo, Jr., as inventors, filed Mar. 15, 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present applicant entity has provided above a specific reference to the application(s)from which priority is being claimed as recited by statute. Applicant entity understands that the statute is unambiguous in its specific reference language and does not require either a serial number or any characterization, such as "continuation" or "continuation-in-part," for claiming priority to U.S. patent applications. Notwithstanding the foregoing, applicant entity understands that the USPTO's computer programs have certain data entry requirements, and hence applicant entity is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates, in general, to data management.

SUMMARY

In one aspect, a method related to data management includes but is not limited to accepting input for a designation of a reference designator in an audio data stream; accepting input for a designation of a beginning demarcation designator in the audio data stream; accepting input for a designation of an ending demarcation designator in the audio data stream; and accepting input for retaining at a high resolution a portion of the audio data stream beginning substantially at the beginning demarcation designator and ending substantially at the ending demarcation designator. In addition to the foregoing, other method aspects are described in the claims, drawings, and text forming a part of the present application.

In one aspect, a system related to data management includes but is not limited to circuitry for accepting input for a designation of a reference designator in an audio data stream; circuitry for accepting input for a designation of a beginning demarcation designator in the audio data stream; circuitry for accepting input for a designation of an ending demarcation designator in the audio data stream; and circuitry for accepting input for retaining at a high resolution a portion of the audio data stream beginning substantially at the beginning demarcation designator and ending substantially at the ending demarcation designator. In addition to the foregoing, other system aspects are described in the claims, drawings, and text forming a part of the present application.

In one or more various aspects, related systems include but are not limited to circuitry and/or programming and/or electro-mechanical devices and/or optical devices for effecting the herein-referenced method aspects; the circuitry and/or programming and/or electro-mechanical devices and/or optical devices can be virtually any combination of hardware, software, and/or firmware configured to effect the herein-referenced method aspects depending upon the design choices of the system designer skilled in the art.

In one aspect, a program product includes but is not limited to a signal bearing medium bearing one or more instructions for accepting input for a designation of a reference designator in an audio data stream; one or more instructions for accepting input for a designation of a beginning demarcation designator in the audio data stream; one or more instructions for accepting input for a designation of an ending demarcation designator in the audio data stream; and one or more instructions for accepting input for retaining at a high resolution a portion of the audio data stream beginning substantially at the beginning demarcation designator and ending substantially at the ending demarcation designator. In addition to the foregoing, other program product aspects are described in the claims, drawings, and text forming a part of the present application.

In addition to the foregoing, various other method, system, and/or program product aspects are set forth and described in the teachings such as the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

FIG. 1A depicts an implementation of an exemplary environment in which the methods and systems described herein may be represented;

FIG. 5 shows several alternative implementations of the high-level logic flowchart of FIG. 3;

FIG. 6 shows several alternative implementations of the high-level logic flowchart of FIG. 3;

FIG. 7 shows several alternative implementations of the high-level logic flowchart of FIG. 2;

FIG. 8 shows several alternative implementations of the high-level logic flowchart of FIG. 7;

FIG. 9 shows several alternative implementations of the high-level logic flowchart of FIG. 7;

FIG. 11 shows several alternative implementations of the high-level logic flowchart of FIG. 2;

The use of the same symbols in different drawings typically indicates similar or identical items.

DETAILED DESCRIPTION

Figure 1B:
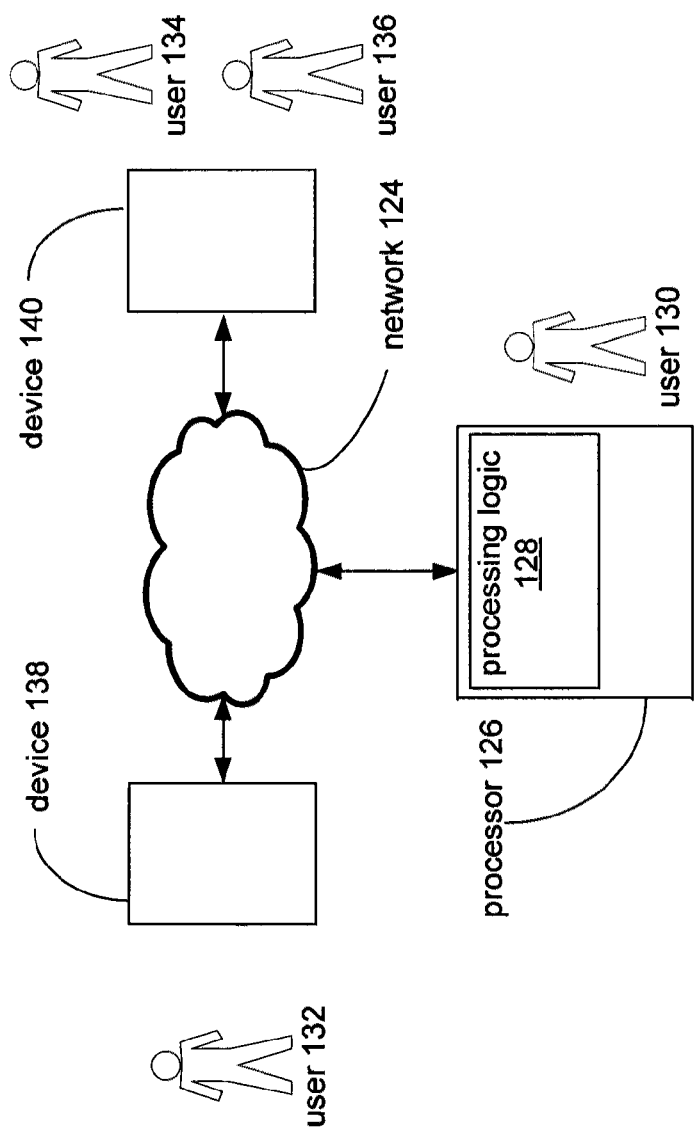
FIG. 1B depicts an implementation of an exemplary environment in which the methods and systems described herein may be represented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1A depicts an implementation of an exemplary environment in which the methods and systems described herein may be represented. In the depicted exemplary environment 100, are illustrated a variety of exemplary sensors: a digital video camera 102 operated by one or more users represented by user 104; a digital video camera 106 used in conjunction with a digital still camera 108, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device), the sensor suite being operated by one or more users represented by user 118. Taken by themselves, each of the sensors 114 and 116 are exemplary of single independent sensors, and further, may be audio-only sensors. The exemplary sensors represent a variety of devices for the detection and/or the recording and/or the transmission of imagery and/or audio aspects, e.g., images, including but not limited to digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118.

The exemplary sensors may be used to detect and/or record and/or transmit images of a wide variety of objects, represented in FIG. 1 by exemplary objects, a sphere 120 and a cube 122. The sphere 120 and the cube 122 are representative of any objects or groups of object, images of which may be detectable and/or recordable and/or transmissible by the exemplary sensors, including but not limited to persons, animals, buildings, roads, automobiles, tracks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images of the exemplary objects in a variety of combinations and sequences. For instance, the digital video camera 102 may detect and/or record and/or transmit an image of the sphere 120 and then an image of the cube 122 sequentially, in either order; and/or, the digital video camera 106 may detect and/or record and/or transmit a single image of the sphere 120 and the cube 122 together.

Similarly, the digital video camera 106 may detect and/or record and/or transmit an image of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image of the sphere 120 and then of the cube 122 sequentially, in either order, and/or of the sphere 120 and the cube 122 together, before, after, partially simultaneously with, or simultaneously with respect to each other.

Such images may be recorded and/or transmitted via a computer or computers represented by the network 124 and/or directly to a processor 126 and/or processing logic 128, which accept data representing imagery aspects of the exemplary objects. The processor 126 represents one or more processors that may be, for example, one or more computers, including but not limited to one or more laptop computers, desktop computers, and/or other types of computers. The processing logic may be software and/or hardware and/or firmware associated with the processor 126 and capable of accepting and/or processing data representing imagery aspects of the exemplary objects from the exemplary sensors. Such processing may include but is not limited to comparing at least a portion of the data from one sensor with at least a portion of the data from the other sensor, and/or applying a mathematical algorithm to at least a portion of the data from one sensor with at least a portion of the data from the other sensor. Such processing may also include, but is not limited to, deriving third data from the combining at least a portion of the data from one sensor with at least a portion of the data from another sensor.

The exemplary sensors may be capable of detecting and/or recording and/or transmitting one or more imagery aspects of the exemplary objects, the one or more imagery aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), and/or flash. Some or all of the parameters that may define at least in part imagery aspects may have further defining parameters. For example, a frequency and/or wavelength parameter may be associated with one or more bandwidth parameters; and a flash parameter may be associated with one or more parameters for, e.g., duration, intensity, and/or special distribution. Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 106 or by the digital video camera 106 and the sensor 114. The processor 126 and/or the processing logic 128 may then combine at least a portion of the data from one of the sensors with at least a portion of the data from the other sensor, e.g., comparing the data from the two sensors. For example, deriving an identity of color and orientation from the bracketing imagery aspect data of two cubes 122 from digital video camera 106 and sensor 114.

Exemplary digital video cameras 102 and/or 106 may also be capable of detecting and/or recording and/or transmitting video and/or audio input as one or more data streams representing the video and/or audio information. Exemplary users 104 and/or 110 and/or another person and/or entity such as user 130 may provide input to the digital video camera 102 and/or the processor 126 and/or the processing logic 128 to select at least a portion of a data stream representing the video and/or audio information for retention at high resolution. Such high resolution retention includes but is not limited to storage of a relatively large amount of data, compared to storage of portions of the data stream not selected for high resolution retention. For example, the user 130 may provide input to the processor 126 and/or the processor logic 128 to identify a portion of a video and/or audio data stream for retention at high resolution. The processor 126 and/or the processor logic 128 may accept the input, enabling the identified portion to be stored with high fidelity relative to the source video and/or audio and with a relatively small proportion of data (if any) discarded, while the portion or portions not selected may be stored at a relatively lower resolution, e.g., with a higher proportion of data discarded to save storage resources. With respect to this example, input for the identification of a particular portion for retention at a relatively higher resolution does not preclude input for the storage of a distinct and/or an overlapping portion of the data stream at a distinct higher resolution compared to the retention resolution of one or more portions not identified for retention at a higher resolution, e.g., one or more portions of a data stream may be identified for retention at one or more relatively high resolutions. A particular portion identified for retention at high resolution may include more than one data set that may generally be considered to constitute a "frame" in a video and/or audio data stream. With respect to this example, digital video cameras 102 and/or 106 are representative of any sensor or sensor suite capable of detecting and/or recording and/or transmitting video and/or audio input as one or more data streams representing the video and/or audio information.

The digital video camera 102, the digital video camera 106, the sensor 114 and/or the sensor 116 (operating as components of sensor suite 112 or separately as single independent sensors) may be capable of detecting and/or recording and/or transmitting information representing audio input and accepting input representing information for the manipulation and/or retention of such audio information, including but not limited to accepting input for a designation of a reference designator in an audio data stream originating from one of the exemplary sensors via detection or transmission or playback; accepting input for a designation of a beginning demarcation designator in such an audio data stream; accepting input for a designation of an ending demarcation designator in such an audio data stream; and accepting input for retaining at a high resolution a portion of such an audio data stream beginning substantially at the beginning demarcation designator and ending substantially at the ending demarcation designator. Such input may include confirmation of previous input. Further, the processor 126 and/or the processing logic 128 may be capable of receiving such an audio data stream from the exemplary sensors and/or from other computing resources and/or capable of playback of such an audio data stream that has been previously retained within the processor 126 and/or the processing logic 128 and/or elsewhere. In addition, processor 126 and/or the processing logic 128 may be capable of accepting input representing information for the manipulation and/or retention of such audio information, including the input described herein in connection with the exemplary sensors.

With regard to input for a designation of a reference designator in an audio data stream, such input may represent an indication from an exemplary user 104, 110, 118, and/or 130, or from the processor 126 and/or the processing logic 128, of audio information of interest, such as a particular human voice or a particular mechanical sound, e.g., an auto engine, or the relative absence of sound, such as a relative silence between two human speakers or two musical phrases. The reference designator may be designated in the audio data stream such that it falls within and/or references a place within the portion of the audio data stream comprising the particular sound of interest. The reference designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in an audio data stream satisfies some criteria for audio data of interest.

With regard to input for designation of a beginning demarcation designator in an audio data stream, such input may represent an indication from an exemplary user 104, 110, 118, and/or 130, or from the processor 126 and/or the processing logic 128, of a point in the audio data stream at which a portion of interest of the audio data stream begins, such as (but not limited to) the end a relative silence (e.g., silence except for background and/or artifact noise) occurring last before a designated reference designator, the beginning of the sound of interest or of one or more of the sounds accompanying a sound of interest, or the end of a sound occurring last before a designated reference designator. The beginning demarcation designator may be designated in the audio data stream such that it falls within and/or references a place at or near the beginning of the portion of the audio data stream comprising the particular sound of interest. The beginning demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in an audio data stream satisfies some criteria for demarcation of audio data of interest.

With regard to input for designation of an ending demarcation designator in an audio data stream, such input may represent an indication from an exemplary user 104, 110, 118, and/or 130, or from the processor 126 and/or the processing logic 128, of a point in the audio data stream at which a portion of interest of the audio data stream ends. The ending demarcation designator may represent the point in the audio data stream falling at the end of a portion of interest, such as (but not limited to) the end a relative silence (e.g., silence except for background and/or artifact noise) occurring just after the end of the sound of interest or of one or more of the sounds accompanying a sound of interest, or the end of a sound occurring just after a designated reference designator. The ending demarcation designator may be designated in the audio data stream such that it falls within and/or references a place at or near the end of the portion of the audio data stream comprising the particular sound of interest. The ending demarcation designator may be designated via initiating input in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in an audio data stream satisfies some criteria for audio data of interest.

With regard to input for retaining at a high resolution a portion of an audio data stream, such high resolution retention includes but is not limited to storage of a relatively large amount of data, compared to storage of portions of the data stream not selected for high resolution retention, as described herein. Such input may include but is not limited to designation of a high resolution value, e.g., 0.5 Mb/second, and/or frequency spectrum characteristics, e.g., lower and upper frequency cut-offs. Such input may be initiated in a variety of ways, including but not limited to pressing a button on a computer interface device, manipulating features of a graphical interface such as pull-down menus or radio buttons, speaking into a microphone, and/or using the processor 126 and/or the processing logic 128 to initiate automatically such input when the data in an audio data stream satisfies some criteria for audio data of interest.

With regard to retaining at a high resolution a portion of an audio data stream, such retention may include storage in computer memory, such as memory associated with and/or operably coupled to the processor 126 and/or the processing logic 128. FIG. 1B depicts an implementation of an exemplary environment in which the methods and systems described herein may be represented. Users 132, 134, and 136 may be participants in a teleconference conducted using voice-over-internet-protocol ("VoIP") technology, such as that provided by such commercial concerns as Vonage® and Skype™. User 130 uses device 138, which may include a computer, a telephone equipped for VoIP communication such as an analog telephone adaptor, an IP phone, or some other item of VoIP-enabling hardware/software/firmware, to conduct a conversation by audio means with users 134 and 136 using device 140, which also may include a computer, a telephone equipped for VoIP communication such as an analog telephone adaptor, an IP phone, or some other item of VoIP-enabling hardware/software/firmware. The devices 138 and 140 are representative of any number of such devices that may be used to conduct a VoIP teleconference including any number of participating parties. Because VoIP uses packet switching, packets conveying audio data travel between the device 138 and the device 140 by different route over the network 124 to be assembled in the proper order at their destinations. During a conversation in this exemplary environment, an audio data stream may be formed as packets are created and/or transmitted at a source device, either the device 138 or the device 140, and this audio data stream is reassembled at the destination device. Audio data streams may be formed and reassembled at the devices 138 and 140 simultaneously. Multiple audio data streams representing different speakers or other distinct audio information sources may be generated and reassembled by the devices 138 and/or 140 during a VoIP teleconference.

Where VoIP technology is being used in conjunction with users using standard telephone equipment connected to the Public Switched Telephone Network ("PSTN"), packets created by VoIP equipment such as the device 138 and/or 140 are conveyed over the network 124, reassembled by a device analogous to the devices 138 and/or 140, and transmitted to the standard telephone user over the PSTN.

An exemplary embodiment may include accepting input for a designation of a reference designator in an audio data stream created at the device 138 and/or the device 140, accepting input for a designation of a beginning demarcation designator an audio data stream created at the device 138 and/or the device 140, accepting input for a designation of an ending demarcation designator an audio data stream created at the device 138 and/or the device 140, accepting input for retaining at high resolution, e.g., storing at high resolution in computer memory, audio data from the audio data stream beginning substantially at the beginning demarcation designator and ending substantially at the ending demarcation designator, and retaining at a high resolution such audio data. These operations may be performed by, for example the processor 126 and/or the processing logic 128, which may be incorporated with the device 138 and/or 140, partially incorporated with the device 138 and/or 140, or separated but operably coupled to the device 138 and/or 140. Each of these operations may be initiated by human action, e.g., the user 130 and/or 132 and/or 134 and/or 136 pressing a button, speaking into a microphone, and/or interacting with graphical user interface features, or they may be initiated by operation of some hardware/software/firmware, e.g., audio processing software such as the processor 126 and/or the processing logic 128, or they may be initiated by some combination of human and automated action. Each of these operations may be performed as an audio data stream is being created at the device 138 and/or 140, and/or as an audio data stream is being reassembled at the device 138 and/or 140, and/or as an audio data stream stored from a VoIP teleconference is played back or analyzed. Each of these operations maybe performed in conjunction with an audio data stream in either analog or digital form.

A reference designator may include information such as an identifier that identifies the particular audio data stream of interest and a place in the audio data stream at which the information of interest is present, e.g., a place in the stream at which a particular speaker is speaking, and/or may fall within the audio data stream at such a place. A beginning demarcation designator may include an identifier that identifies the particular audio data stream of interest and an identifier of the first packet of a sequence of packets of interest and/or may fall within the audio data stream. An ending demarcation designator may include an identifier that identifies the particular audio data stream of interest and an identifier of the last packet of a sequence of packets of interest and/or may fall with the audio data stream.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary users (users 104, 110, and 118), the exemplary objects (the sphere 120 and the cube 122), the network 124, the exemplary processor 126, and the exemplary processing logic 128 constitute only a few of the aspects illustrated by FIG. 1.

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 2:
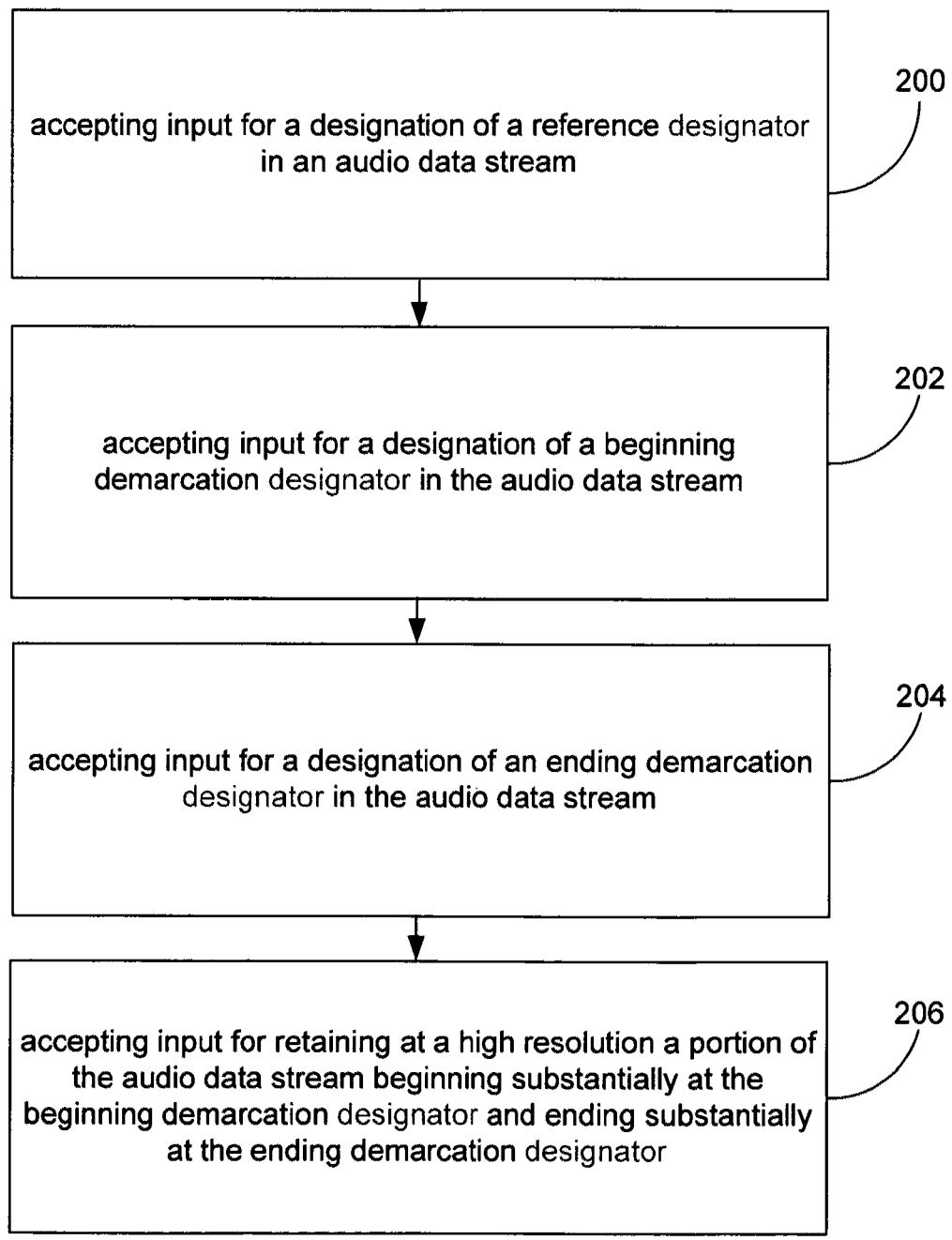
FIG. 2 depicts a high-level logic flowchart of an operational process.

FIG. 2 depicts a high-level logic flowchart of an operational process. The illustrated process may include the operations 200, 202, 204, and/or 206.

Operation 200 shows accepting input for a designation of a reference designator in an audio data stream. Operation 200 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, for designation of a reference designator in an audio data stream, marking a place in the audio data stream at which one or more voices and/or sounds of interest, such as the voice of a particular person or the noise generated by a particular device such as an auto engine, occur in the audio data stream. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action.

Operation 202 depicts accepting input for a designation of a beginning demarcation designator in the audio data stream. Operation 202 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, for designation of a place demarcating the beginning of a portion of an audio data stream of interest, such as the beginning of a recorded voice and/or a sound designated by a reference designator. Operation 202 may include, for example, accepting input specifying a time index in a recorded audio data stream or a packet in a VoIP audio data stream. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action.

Operation 204 illustrates accepting input for a designation of an ending demarcation designator in the audio data stream. Operation 204 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, for designation of a place demarcating the ending of a portion of an audio data stream of interest, such as the ending of a recorded voice and/or a sound designated by a reference designator located at some place in the stream during the occurrence of the recorded voice. Operation 204 may include, for example, accepting input specifying a time index in a recorded audio data stream or a packet in a VoIP audio data stream. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action.

Operation 206 shows accepting input for retaining at a high resolution a portion of the audio data stream beginning substantially at the beginning demarcation designator and ending substantially at the ending demarcation designator. Operation 206 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, for retention of a portion of interest of an audio data stream at relatively high resolution relative to retention of another portion of the audio data stream, such as 1.0 Mb/second compared to 0.2 Mb/second, where the portion of interest is identified by a reference designator located at some place in the stream during the occurrence of the recorded voice, a beginning demarcation designator, and an ending demarcation designator. Such an input may include but is not limited to a high resolution value, for example, 1.2 Mb/second. Such an input may include but is not limited to, for instance, a frequency spectrum characteristic such as a lower and/or an upper cut-off frequency defining frequencies to be included in a retained portion of an audio data stream, and/or an intensity characteristic such as a lower and/or an upper cut-off intensity defining intensities to be included in a retained portion of an audio data stream. Such an audio data stream may be, for example, a play-back of a recorded and/or stored audio data stream or a live audio data stream being created and/or transmitted and/or received and/or reassembled during, for instance, a VoIP teleconference. Such an input may be initiated by an action by a user 104/110/118/130/132/134/136, e.g., pressing a mouse button and/or speaking into a microphone, or the input may be initiated by operation of some hardware/software/firmware, e.g., audio processing software such as the processor 126 and/or the processing logic 128 and/or devices 138/140, or it may be initiated by some combination of human and automated action. Operation 206 may include but is not limited to accepting tactile input, sonic input, and/or visual input as described herein.

Figure 3:
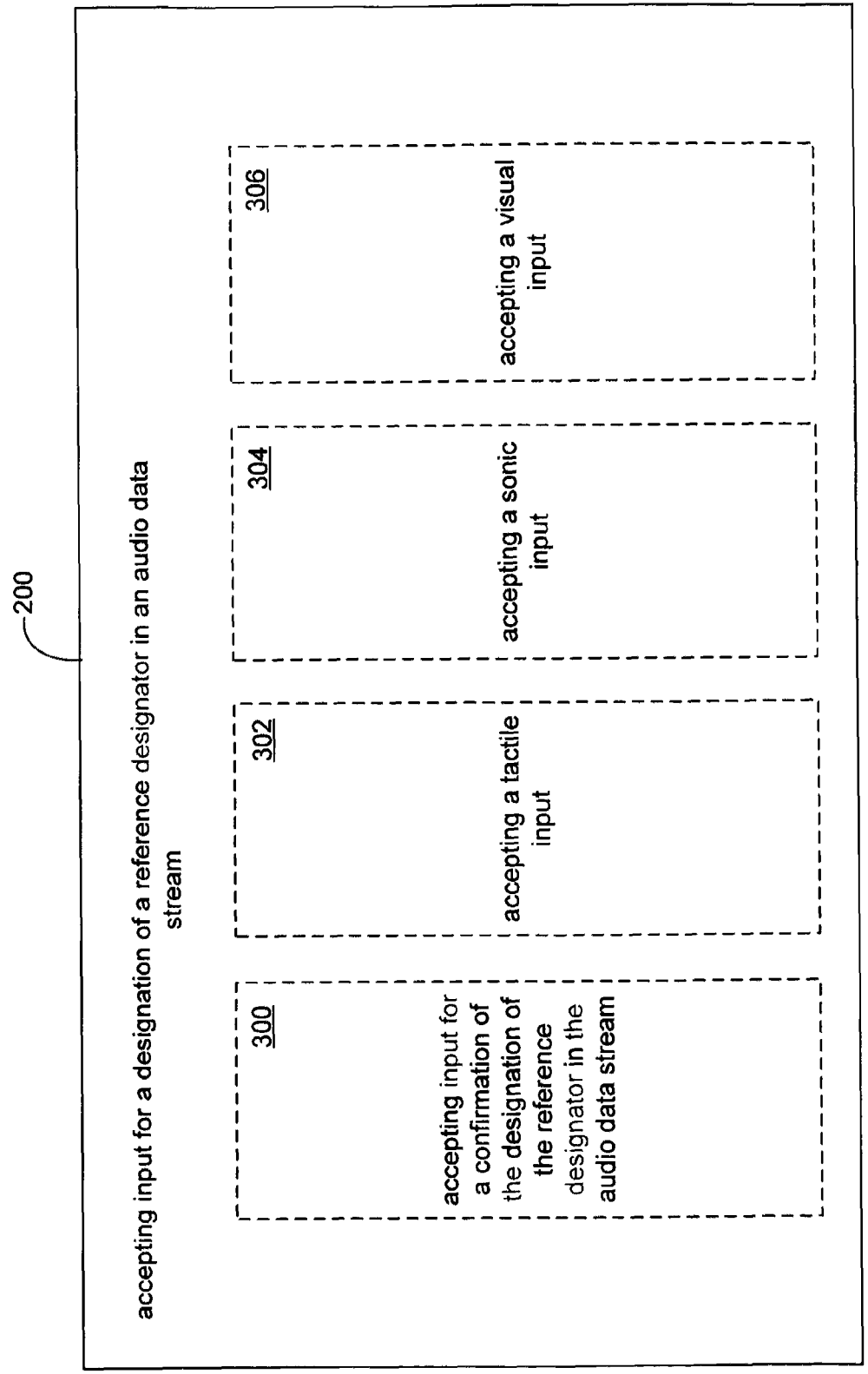
FIG. 3 shows several alternative implementations of the high-level logic flowchart of FIG. 2.

FIG. 3 shows several alternative implementations of the high-level logic flowchart of FIG. 2. Operation 200—accepting input for a designation of a reference designator in an audio data stream—may include one or more of the following operations: 300, 302, 304, and/or 306.

Operation 300 illustrates accepting input for a confirmation of the designation of the reference designator in the audio data stream. Operation 300 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying a confirmation by a user 104/110/118/130/132/134/136 and/or by an automated operation of the processor 126 and/or the processing logic 128 of a previous input for designation of a reference designator in an audio data stream, where the reference designator designates a place within a recorded sound of interest occurring within an audio data stream. Such confirmation may include, for instance, an affirmative reply by a user 104/110/118/130/132/134/136 to a query as to whether a displayed designation is desired.

Operation 302 depicts accepting a tactile input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 mechanically manipulating an interface device and/or feature, such as a mouse input device and/or a drop-down menu of a graphical user interface).

Operation 304 shows accepting a sonic input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 speaking and/or generating some sonic signal such as a click or a whistle into an interface device such as a microphone, or where the input is initiated by an automated operation of the processor 126 and/or the processing logic 128 playing back a recording of such a sonic signal).

Operation 306 illustrates accepting a visual input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a video input device such as a camera and/or a light/infrared sensor and/or a visual component of a graphical user interface, or where the input is initiated by an automated operation of the processor 126 and/or the processing logic 128 playing back a recording of a visual signal or of an interaction with a graphical user interface).

Figure 4:
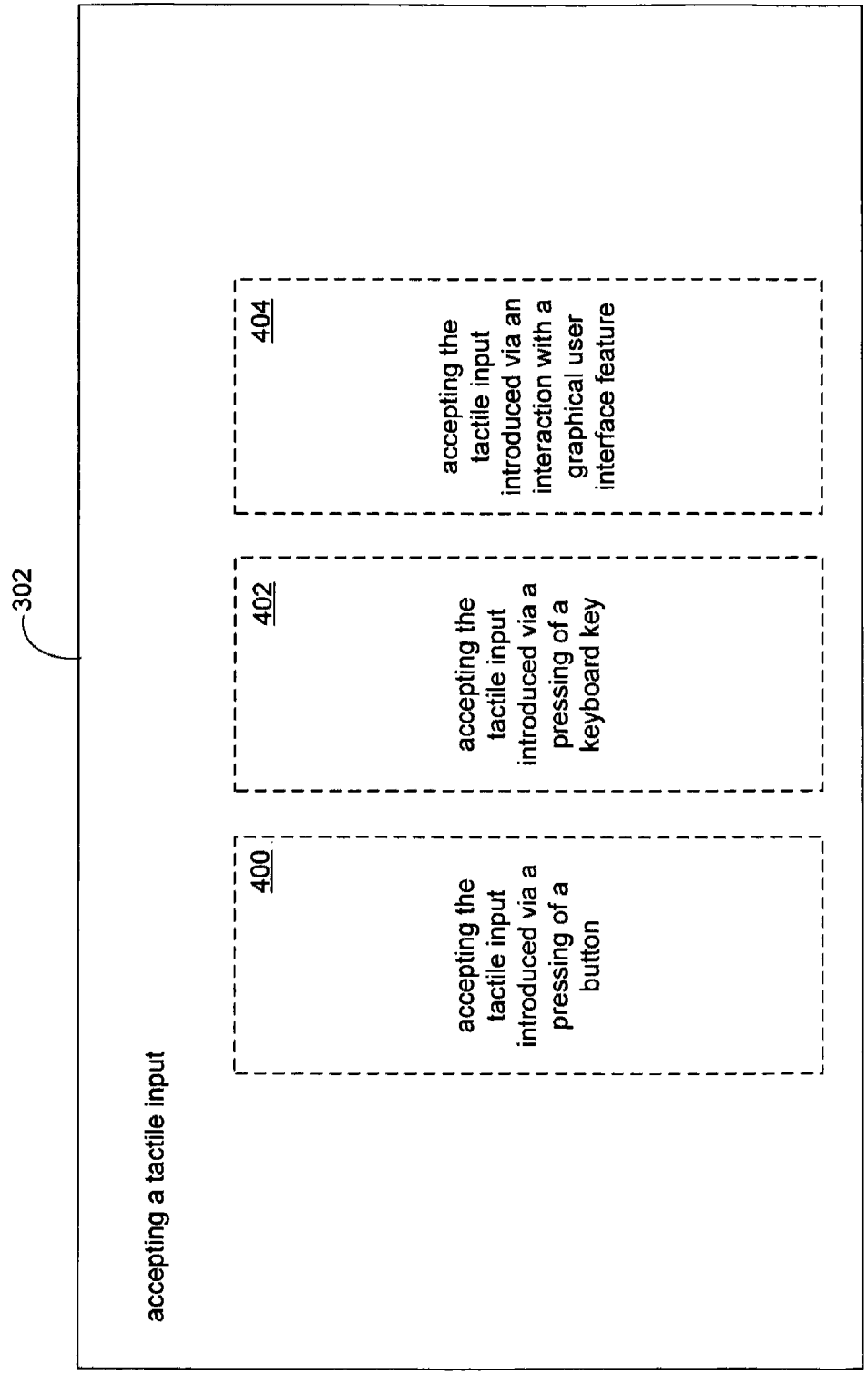
FIG. 4 shows several alternative implementations of the high-level logic flowchart of FIG. 3.

FIG. 4 shows several alternative implementations of the high-level logic flowchart of FIG. 3. Operation 302—accepting a tactile input—may include one or more of the following operations: 400, 402, and/or 404.

Operation 400 depicts accepting the tactile input introduced via a pressing of a button (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 mechanically manipulating a button on a mouse input device).

Operation 402 illustrates accepting the tactile input introduced via a pressing of a keyboard key (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 mechanically manipulating a computer keyboard key).

Operation 404 shows accepting the tactile input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a button included in a graphical user interface).

FIG. 5 shows several alternative implementations of the high-level logic flowchart of FIG. 3. Operation 304—accepting a sonic input—may include one or more or the following operations: 500, 502, 504, and/or 506.

Operation 500 shows accepting the sonic input introduced via a microphone (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made that is detected by a microphone).

Operation 502 illustrates accepting the sonic input, wherein the sonic input includes a human vocal input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 speaking into a microphone).

Operation 504 depicts accepting the sonic input, wherein the sonic input includes a mechanically-produced input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made mechanically by a speaker).

Operation 506 shows accepting the sonic input, wherein the sonic input includes data representing stored sonic information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 playing back a recording of someone speaking into a microphone).

FIG. 6 shows several alternative implementations of the high-level logic flowchart of FIG. 3. Operation 306—accepting a visual input—may include one or more or the following operations: 600, 602, and/or 604.

Operation 600 depicts accepting the visual input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a button in a visual presentation of a graphical user interface, or where the input is initiated by an automated operation of the processor 126 and/or the processing logic 128 playing back a recording of an interaction with a graphical user interface).

Operation 602 shows accepting the visual input introduced via an electromagnetic-radiation detection device (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a light flash that is detected by a camera, or where the input is initiated by an automated operation of the processor 126 and/or the processing logic 128 playing back a recording of such a visual signal).

Operation 604 illustrates accepting the visual input, wherein the visual input includes data representing stored visual information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 making a sign that is detected by a camera or by a user 104/110/118/130/132/134/136 playing back a video recording of a making a sign that is detected by a camera).

FIG. 7 shows several alternative implementations of the high-level logic flowchart of FIG. 2. Operation 202—accepting input for a designation of a beginning demarcation designator in the audio data stream—may include one or more of the following operations: 700, 702, 704, 706, 708, 710 and/or 712.

Operation 700 shows accepting input for a confirmation of the designation of the beginning demarcation designator in the audio data stream. Operation 700 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying confirmation by user 104/110/118/130/132/134/136 and/or by an automated operation of the processor 126 and/or the processing logic 128 of a previous input for designation of a beginning demarcation designator in an audio data stream, where the beginning demarcation designator is before a reference designator in the stream. Such confirmation may include, for example, an automated check by the processor 126 and/or the processing logic 128 of the previous input for designation of the beginning demarcation designator.

Operation 702 illustrates accepting input for a designation of an ending designator of a latest relative silence prior to the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying the end of a relative silence just before a voice of interest, where the voice of interest is designated by a reference designator in the voice in the stream).

Operation 704 depicts accepting input of a designation of a beginning designator of a sound at the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying the beginning of a sound of interest, where the sound of interest is designated by a reference designator in the sound in the stream).

Operation 706 depicts accepting input of a designation of an ending designator of a latest sound prior to the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying the end of a sound just before a sound of interest, where the sound of interest is designated by a reference designator in the sound in the stream).

Operation 708 shows accepting a tactile input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/130/132/134/136 interacting mechanically with an input device such as a mouse and/or a keyboard).

Operation 710 illustrates accepting a sonic input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/130/132/134/136 interacting with a microphone).

Operation 712 shows accepting a visual input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/130/132/134/136 interacting with an image detection device such as a light sensor).

FIG. 8 shows several alternative implementations of the high-level logic flowchart of FIG. 7. Operation 708—accepting a tactile input—may include one or more of the following operations: 800, 802, and/or 804.

Operation 800 depicts accepting the tactile input introduced via a pressing of a button (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 mechanically manipulating a button on a mouse input device).

Operation 802 shows accepting the tactile input introduced via a pressing of a keyboard key (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 mechanically manipulating a computer keyboard key). Operation 804 illustrates accepting the tactile input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a drop-down menu included in a graphical user interface).

FIG. 9 shows several alternative implementations of the high-level logic flowchart of FIG. 7. Operation 710—accepting a sonic input—may include one or more of the following operations: 900, 902, 904 and/or 906.

Operation 900 illustrates accepting the sonic input introduced via a microphone (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made that is detected by a microphone).

Operation 902 shows accepting the sonic input, wherein the sonic input includes a human vocal input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 speaking into a microphone).

Operation 904 depicts accepting the sonic input, wherein the sonic input includes a mechanically-produced input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made mechanically by a buzzer).

Operation 906 depicts accepting the sonic input, wherein the sonic input includes data representing stored sonic information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 playing back a recording of someone speaking into a microphone).

Figure 10:
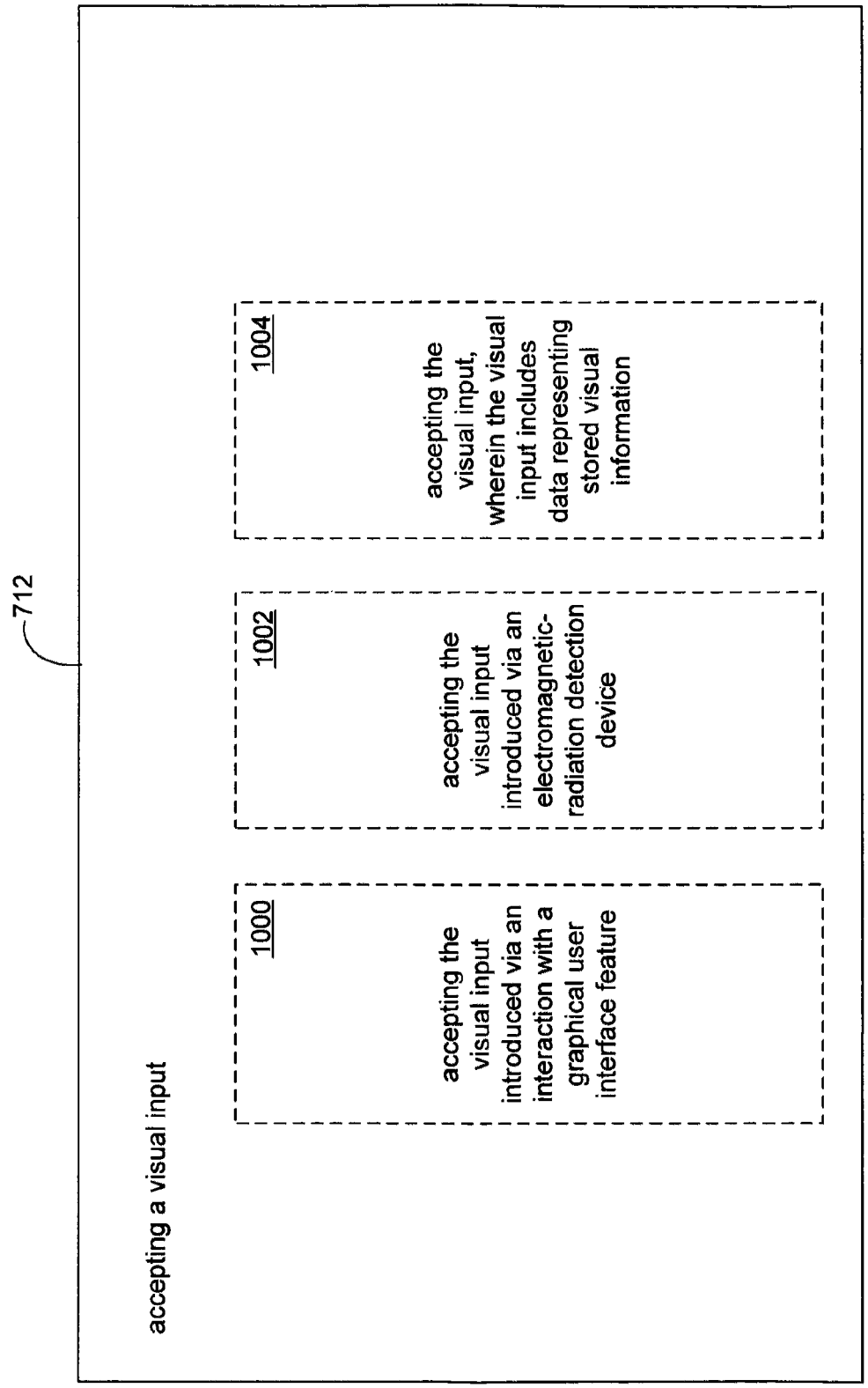
FIG. 10 shows several alternative implementations of the high-level logic flowchart of FIG. 7.

FIG. 10 shows several alternative implementations of the high-level logic flowchart of FIG. 7. Operation 712—accepting a visual input—may include one or more of the following operations: 1000, 1002, and/or 1004.

Operation 1000 depicts accepting the visual input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a button in a visual presentation of a graphical user interface).

Operation 1002 illustrates accepting the visual input introduced via an electromagnetic-radiation detection device (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 making a sign that is detected by a camera).

Operation 1004 shows accepting the visual input, wherein the visual input includes data representing stored visual information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 playing back a recording of a light flash that is detected by a light sensor).

FIG. 11 shows several alternative implementations of the high-level logic flowchart of FIG. 2. Operation 204—accepting input for a designation of an ending demarcation designator in the audio data stream—may include one or more of the following operations: 1100, 1102, 1104, 1106, 1108, 1110, and/or 1112.

Operation 1100 illustrates accepting input for a confirmation of the designation of the ending demarcation designator in the audio data stream. Operation 1100 may include, for example, accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, signifying confirmation by the user 104/110/118/130/132/134/136 and/or by an automated operation of the processor 126 and/or the processing logic 128 of a previous input for designation of an ending demarcation designator in an audio data stream, where the ending demarcation designator is after a beginning demarcation designator in the stream. Such confirmation may include, for example, an affirmative response by the user 104/110/118/ 130/132/134/136 in response to a query as to whether the previous input for designation of the ending demarcation designator is desired.

Operation 1102 illustrates accepting input for a designation of an ending designator of a sound at the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/ 132/134/136 via interaction with, for instance, a keyboard and/or a radio button of a graphical user interface, and/or by an automated operation of the processor 126 and/or of the processing logic 128, signifying the end of a voice and/or of a sound of interest in the audio data stream, where the voice/sound of interest is designated by a reference designator in the voice in the stream).

Operation 1104 depicts accepting input of a designation of a beginning designator of a relative silence after a sound at the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 via interaction with, for instance, a microphone and/or a camera, and/or by an automated operation of the processor 126 and/or of the processing logic 128, signifying the beginning of a relative silence just after a voice and/or sound of interest in the audio data stream, where the voice/sound of interest is designated by a reference designator in the sound in the stream).

Operation 1106 shows accepting input of a designation of an ending designator of a relative silence after a sound at the reference designator in the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 via interaction with, for instance, a microphone and/or a camera, and/or by an automated operation of the processor 126 and/or of the processing logic 128, signifying the end of a relative silence just after a voice and/or sound of interest in the audio data stream, where the voice/sound of interest is designated by a reference designator in the sound in the stream).

Operation 1108 shows accepting a tactile input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/ 130/132/134/136 interacting mechanically with an input device such as a mouse and/or a keyboard, and/or with a radio button of a graphical user interface).

Operation 1110 depicts accepting a sonic input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/ 130/132/134/136 interacting with a microphone by causing a detectable sonic signal, such as a word or a distinctive sound to be made, or by an automated operation of the processor 126 and/or the processing logic 128 playing back a recording of such a sonic signal).

Operation 1112 shows accepting a visual input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, initiated by a user 104/110/118/ 130/132/134/136 interacting with an image detection device such as a light sensor, or by an automated operation of the processor 126 and/or the processing logic 128 playing back a recording of such a visual signal).

Figure 12:
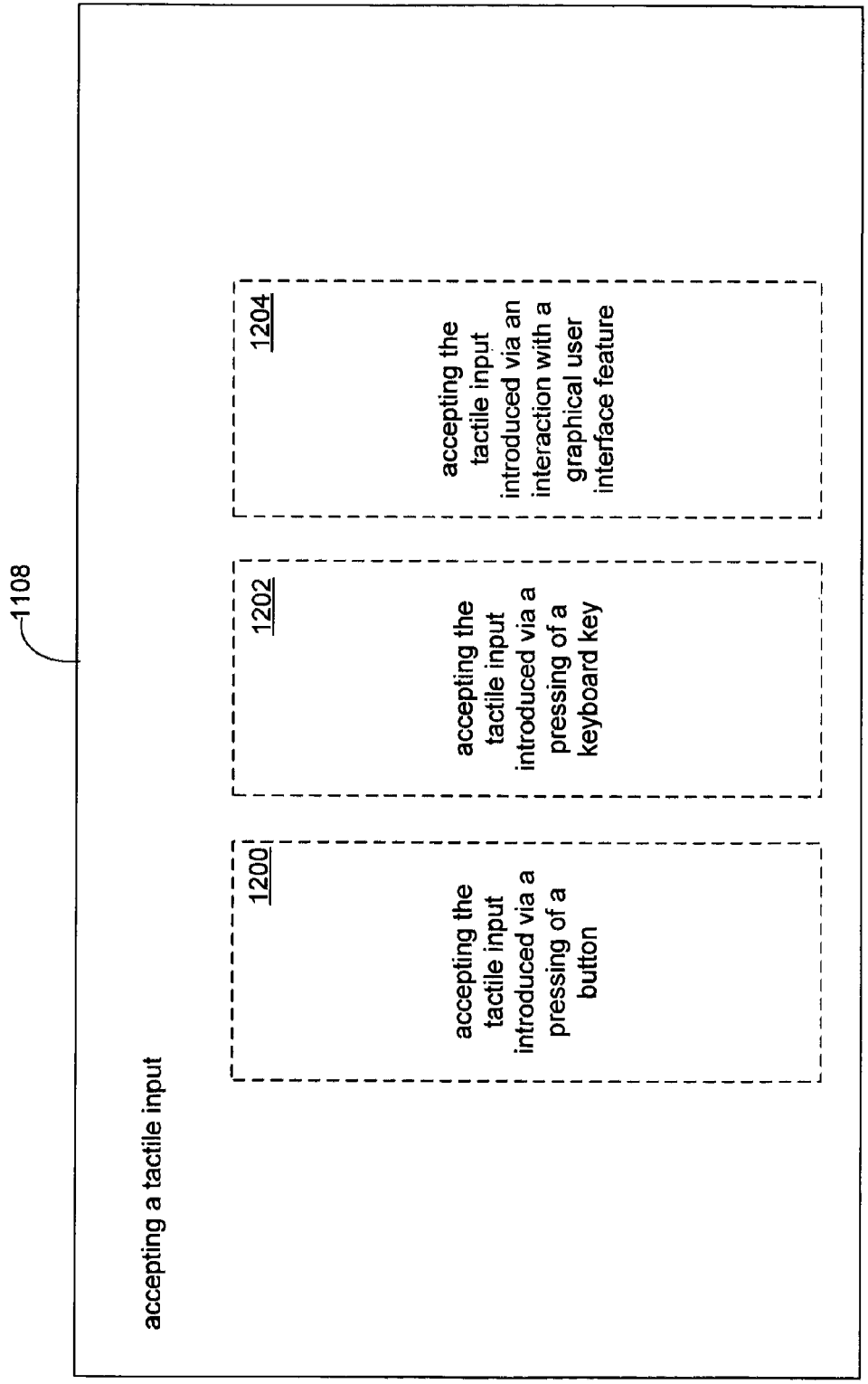
FIG. 12 shows several alternative implementations of the high-level logic flowchart of FIG. 11.

FIG. 12 shows several alternative implementations of the high-level logic flowchart of FIG. 11. Operation 1108—accepting a tactile input—may include one or more of the following operations: 1200, 1202, and/or 1204.

Operation 1200 depicts accepting the tactile input introduced via a pressing of a button (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/ 132/134/136 mechanically manipulating a button on a touchpad/button device).

Operation 1202 shows accepting the tactile input introduced via a pressing of a keyboard key (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/ 118/130/132/134/136 mechanically manipulating a personal digital assistant keyboard key).

Operation 1204 illustrates accepting the tactile input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a drop-down menu included in a graphical user interface).

Figure 13:
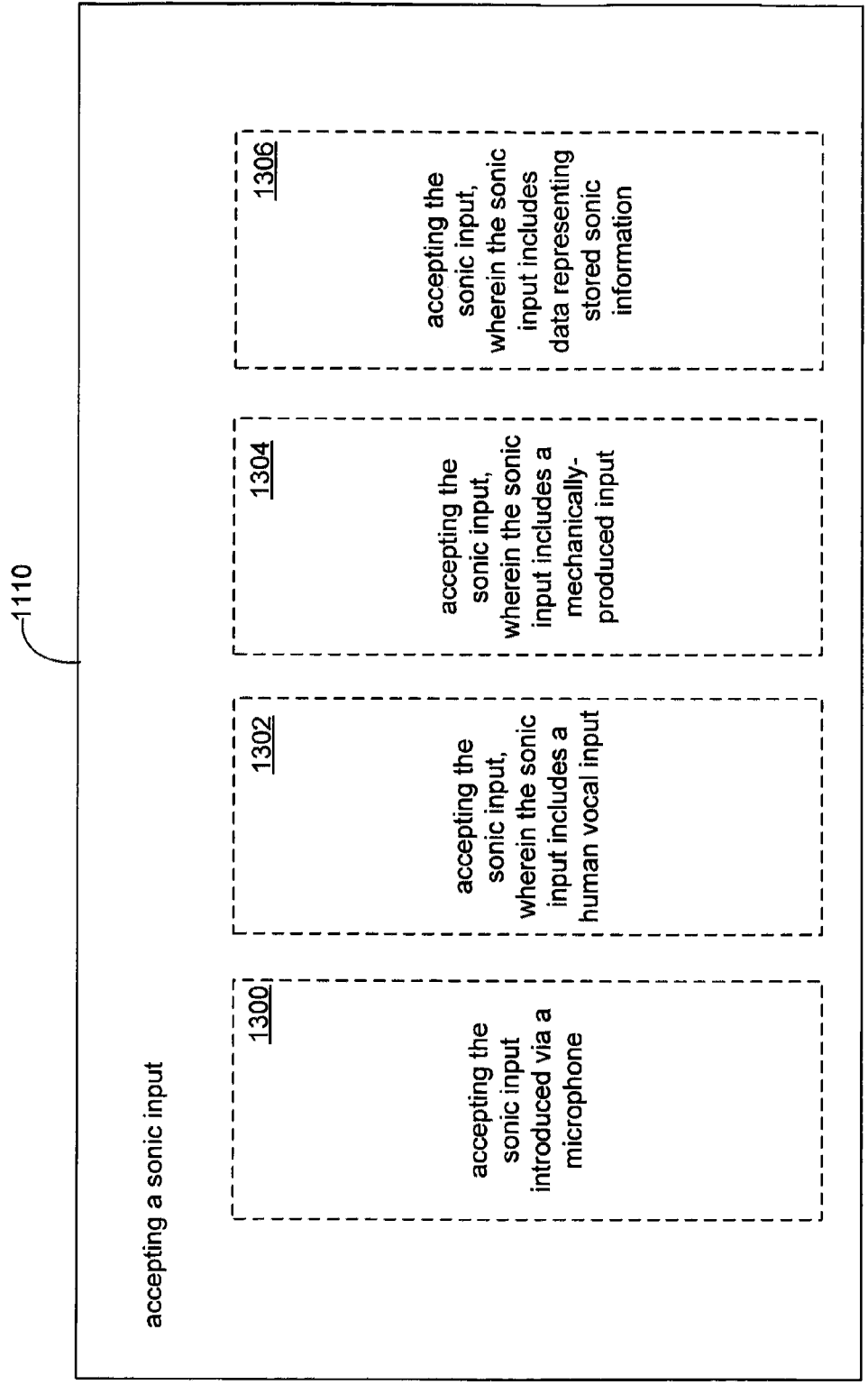
FIG. 13 shows several alternative implementations of the high-level logic flowchart of FIG. 11.

FIG. 13 shows several alternative implementations of the high-level logic flowchart of FIG. 11. Operation 1110—accepting a sonic input—may include one or more of the following operations: 1300, 1302, 1304 and/or 1306.

Operation 1300 illustrates accepting the sonic input introduced via a microphone (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made that is detected by a microphone).

Operation 1302 shows accepting the sonic input, wherein the sonic input includes a human vocal input (e.g., accepting the sonic input, wherein the sonic input includes a human vocal input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 speaking into a microphone).

Operation 1304 depicts accepting the sonic input, wherein the sonic input includes a mechanically-produced input (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 causing a sound to be made mechanically by a buzzer).

Operation 1306 depicts accepting the sonic input, wherein the sonic input includes data representing stored sonic information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 playing back a recording of a someone speaking into a microphone).

Figure 14:
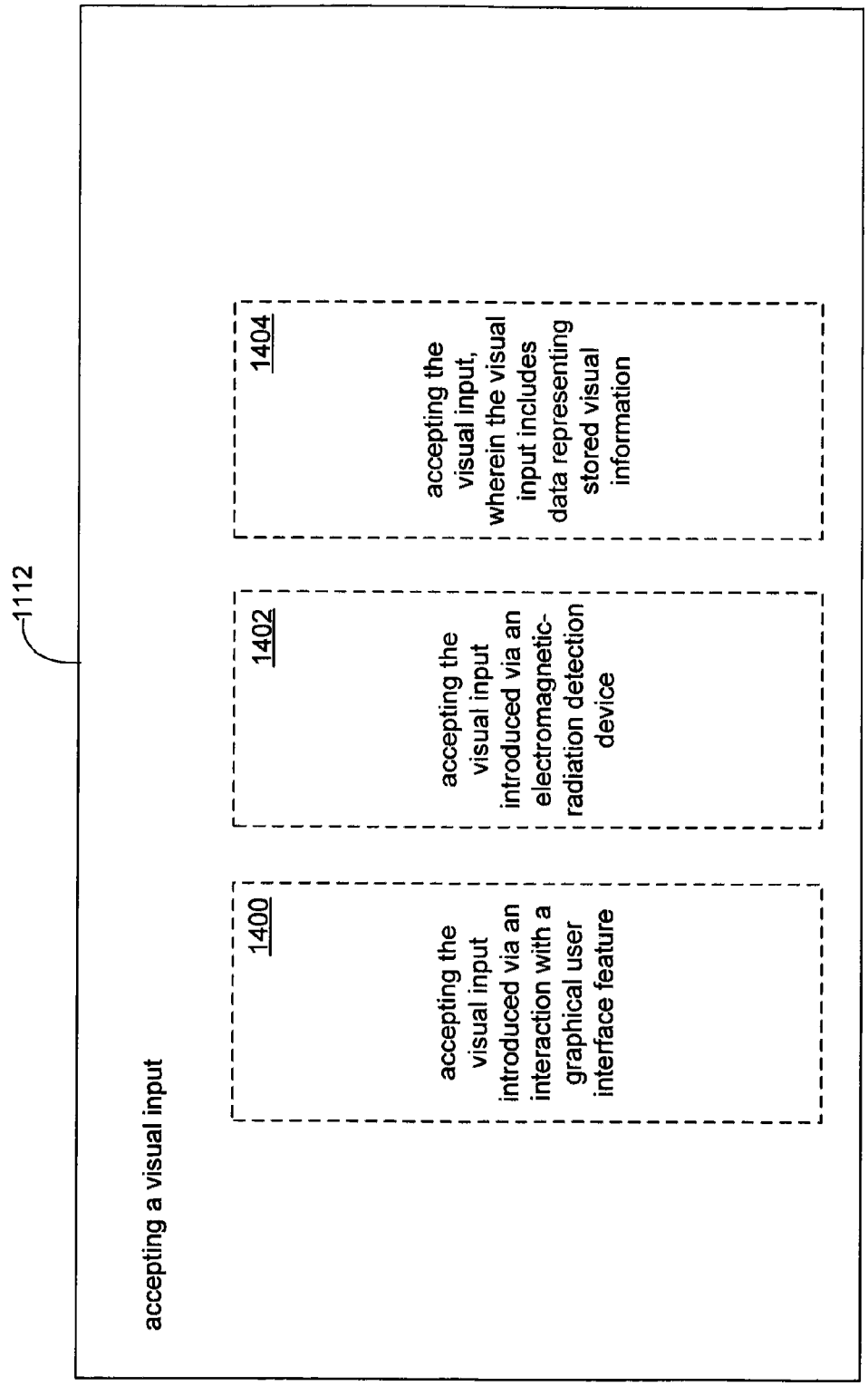
FIG. 14 shows several alternative implementations of the high-level logic flowchart of FIG. 11.

FIG. 14 shows several alternative implementations of the high-level logic flowchart of FIG. 11. Operation 1112—accepting a visual input—may include one or more of the following operations: 1400, 1402, and/or 1404.

Operation 1400 depicts accepting the visual input introduced via an interaction with a graphical user interface feature (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 interacting with a control panel in a visual presentation of a graphical user interface).

Operation 1402 illustrates accepting the visual input introduced via an electromagnetic-radiation detection device (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 making a sign that is detected by an infrared sensor).

Operation 1404 shows accepting the visual input, wherein the visual input includes data representing stored visual information (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, where the input is initiated by a user 104/110/118/130/132/134/136 playing back a recording of a light flash that is detected by a light sensor).

Figure 15:
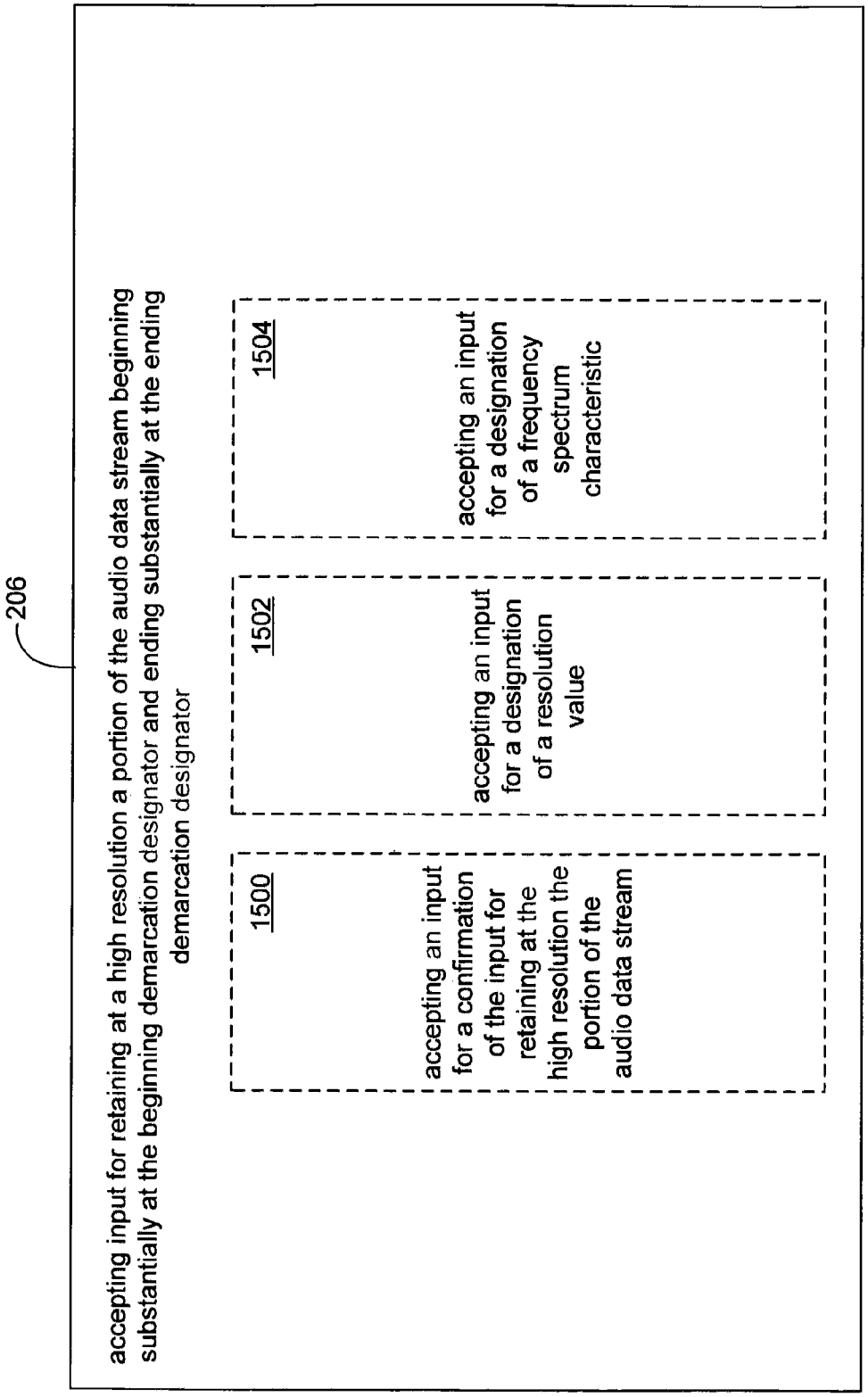
FIG. 15 shows several alternative implementations of the high-level logic flowchart of FIG. 2.

FIG. 15 shows several alternative implementations of the high-level logic flowchart of FIG. 2. Operation 206—accepting input for retaining at a high resolution a portion of the audio data stream beginning substantially at the beginning demarcation designator and ending substantially at the ending demarcation designator—may include one or more of the following operations: 1500, 1502, and/or 1504.

Operation 1500 shows accepting an input for a confirmation of the input for retaining at the high resolution the portion of the audio data stream (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, from a user 104/110/118/130/132/134/136 signifying confirmation of a prior input for retention of a portion of an audio data stream).

Operation 1502 depicts accepting an input for a designation of a resolution value (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, from a user 104/110/118/130/132/134/136 for designation of a particular resolution value for retention of a portion of an audio data stream, such as 1.2 Mb/second).

Operation 1504 illustrates accepting an input for a designation of a frequency spectrum characteristic (e.g., accepting input, via a processor 126 and/or a processing logic 128 and/or a digital video camera 102 and/or a digital video camera 106 and/or a sensor 114 and/or a sensor 116 and/or a processor 128 and/or processing logic 128 and/or the device 138 and/or the device 140, from a user 104/110/118/130/132/134/136 for designation of a particular lower frequency cutoff for retention of a portion of an audio data stream, such as 800 Hz).

Figure 16:
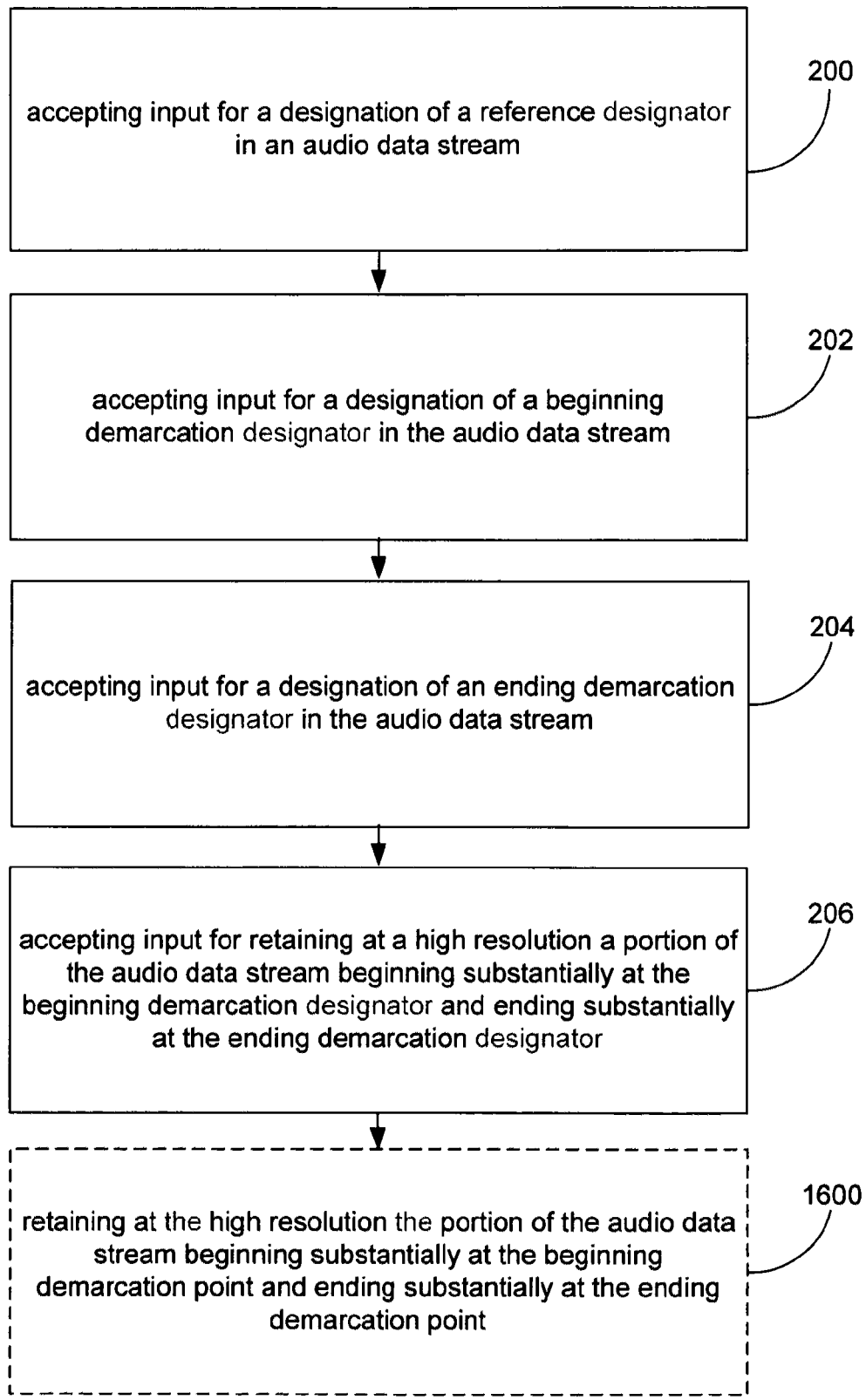
FIG. 16 shows a high-level logic flowchart of an operational process.

FIG. 16 shows a high-level logic flowchart of an operational process. Operation 1600 depicts retaining at the high resolution the portion of the audio data stream beginning substantially at the beginning demarcation designator and ending substantially at the ending demarcation designator. Operation 1600 may include, for example, retaining, via a processor 126 and/or a processing logic 128 and/or a digital video camera 102 and/or a digital video camera 106 and/or a sensor 114 and/or a sensor 116, at a high resolution a portion of an audio data stream relative to retention of another portion of the audio data stream, such as 1.0 Mb/second compared to 0.2 Mb/second, where the portion to be retained is identified by a reference designator located at some place in the stream during the occurrence of the recorded voice, a beginning demarcation designator, and an ending demarcation designator. Such an audio data stream may be, for example, a playback of a recorded and/or stored audio data stream or a live audio data stream being created or reassembled during, for instance, a VoIP teleconference. Such an input may be initiated by an action by a user 104/110/118/130/132/134/136, e.g., pressing a mouse input device button and/or speaking into a microphone, or the input may be initiated by operation of some hardware/software/firmware, e.g., audio processing software such as the processor 126 and/or the processing logic 128 and/or the device 138/140, or it may be initiated by some combination of human and automated action.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., " a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A machine, comprising:
   circuitry for accepting input for a designation of a reference designator associated with a sound of interest in an audio data stream;
   circuitry for accepting input for a designation of a beginning demarcation designator associated with a beginning of a presence in the audio data stream of the sound of interest designated by the reference designator;
   circuitry for accepting input for a designation of an ending demarcation designator associated with an ending of the presence in the audio data stream of the sound of interest designated by the reference designator;
   circuitry for accepting input for retaining at a high resolution a portion of the audio data stream associated with the presence of the sound of interest, the portion for retaining at a high resolution beginning at the beginning demarcation designator and ending at the ending demarcation designator; and
   circuitry for retaining at the high resolution the portion of the audio data stream associated with the presence of the sound of interest, the retaining at the high resolution relative to retention of another portion of the audio data stream not associated with the presence of the sound of interest and designated for retention at a resolution lower than the high resolution.

2. The machine of claim 1, wherein circuitry for accepting input for a designation of a reference designator associated with a sound of interest in an audio data stream comprises:
   circuitry for accepting input for a confirmation of the designation of the reference designator associated with the sound of interest in the audio data stream.

3. The machine of claim 1, wherein circuitry for accepting input for a designation of a reference designator associated with a sound of interest in an audio data stream comprises:
   circuitry for accepting a tactile input.

4. The machine of claim 1, wherein circuitry for accepting input for a designation of a reference designator associated with a sound of interest in an audio data stream comprises:
   circuitry for accepting a sonic input.

5. The machine of claim 4, wherein circuitry for accepting a sonic input comprises:
   circuitry for accepting a mechanically-produced sonic input.

6. The machine of claim 1, wherein circuitry for accepting input for a designation of a reference designator associated with a sound of interest in an audio data stream comprises:
 circuitry for accepting a visual input.

7. The machine of claim 6, wherein circuitry for accepting a visual input comprises:
 circuitry for accepting the visual input, wherein the visual input includes data representing stored visual information.

8. The machine of claim 1, wherein circuitry for accepting input for a designation of a beginning demarcation designator associated with a beginning of a presence in the audio data stream of the sound of interest designated by the reference designator comprises:
 accepting input for a designation of an ending designator of a latest relative silence prior to the reference designator in the audio data stream.

9. The machine of claim 1, wherein circuitry for accepting input for a designation of a beginning demarcation designator associated with a beginning of a presence in the audio data stream of the sound of interest designated by the reference designator comprises:
 circuitry for accepting a tactile input.

10. The machine of claim 9, wherein circuitry for accepting a tactile input comprises:
 circuitry for accepting the tactile input introduced via an interaction with a graphical user interface feature.

11. The machine of claim 1, wherein circuitry for accepting input for a designation of a beginning demarcation designator associated with a beginning of a presence in the audio data stream of the sound of interest designated by the reference designator comprises:
 circuitry for accepting a sonic input from the audio data stream, including at least circuitry for designating the beginning demarcation designator at least partially based on a detection of the beginning of the presence of the sound of interest in the audio data stream.

12. The machine of claim 11, wherein circuitry for accepting a sonic input comprises:
 circuitry for accepting the sonic input, wherein the sonic input includes data representing stored sonic information.

13. The machine of claim 1, wherein circuitry for accepting input for a designation of a beginning demarcation designator associated with a beginning of a presence in the audio data stream of the sound of interest designated by the reference designator comprises:
 circuitry for accepting a visual input.

14. The machine of claim 13, wherein circuitry for accepting a visual input comprises:
 circuitry for accepting the visual input introduced via an electromagnetic-radiation detection device including at least detection of a light flash associated with designating the beginning demarcation designator.

15. The machine of claim 1, wherein circuitry for accepting input for a designation of an ending demarcation designator associated with an ending of the presence in the audio data stream of the sound of interest designated by the reference designator comprises:
 circuitry for accepting input for a confirmation of the designation of the ending demarcation designator associated with an ending of the presence in the audio data stream of the sound of interest designated by the reference designator.

16. The machine of claim 1, wherein circuitry for accepting input for a designation of an ending demarcation designator associated with an ending of the presence in the audio data stream of the sound of interest designated by the reference designator comprises:
 circuitry for accepting a visual input.

17. The machine of claim 1, wherein circuitry for accepting input for retaining at a high resolution a portion of the audio data stream associated with the presence of the sound of interest, the portion for retaining at a high resolution beginning at the beginning demarcation designator and ending at the ending demarcation designator comprises:
 circuitry for accepting an input for a confirmation of the input for retaining at the high resolution the portion of the audio data stream associated with the presence of the sound of interest.

18. The machine of claim 1, wherein circuitry for accepting input for retaining at a high resolution a portion of the audio data stream associated with the presence of the sound of interest, the portion for retaining at a high resolution beginning at the beginning demarcation designator and ending at the ending demarcation designator comprises:
 circuitry for accepting an input for a designation of a resolution value associated with retaining the portion of the audio stream associated with the presence of the sound of interest.

19. A method, comprising:
 accepting input for a designation of a reference designator associated with a sound of interest in an audio data stream;
 accepting input for a designation of a beginning demarcation designator associated with a beginning of a presence in the audio data stream of the sound of interest designated by the reference designator;
 accepting input for a designation of an ending demarcation designator associated with an ending of the presence in the audio data stream of the sound of interest designated by the reference designator;
 accepting input for retaining at a high resolution a portion of the audio data stream associated with the presence of the sound of interest, the portion for retaining at a high resolution beginning at the beginning demarcation designator and ending at the ending demarcation designator; and
 retaining at the high resolution the portion of the audio data stream associated with the presence of the sound of interest, the retaining at the high resolution relative to retention of another portion of the audio data stream not associated with the presence of the sound of interest and designated for retention at a resolution lower than the high resolution,
 wherein at least one of accepting input for a designation of a reference designator, accepting input for a designation of a beginning demarcation designator, accepting input for a designation of an ending demarcation designator, accepting input for retaining, or retaining the designated portion of the audio data stream is at least partially implemented using at least one processing device.

20. A machine, comprising:
 means for accepting input for a designation of a reference designator associated with a sound of interest in an audio data stream;
 means for accepting input for a designation of a beginning demarcation designator associated with a beginning of a presence in the audio data stream of the sound of interest designated by the reference designator;
 means for accepting input for a designation of an ending demarcation designator associated with an ending of the presence in the audio data stream of the sound of interest designated by the reference designator;

means for accepting input for retaining at a high resolution a portion of the audio data stream associated with the presence of the sound of interest, the portion for retaining at a high resolution beginning at the beginning demarcation designator and ending at the ending demarcation designator; and means for retaining at the high resolution the portion of the audio data stream associated with the presence of the sound of interest, the retaining at the high resolution relative to retention of another portion of the audio data stream not associated with the presence of the sound of interest and designated for retention at a resolution lower than the high resolution, wherein at least one of the means for accepting input for a designation of a reference designator, means for accepting input for a designation of a beginning demarcation designator, means for accepting input for a designation of an ending demarcation designator, means for accepting input for retaining, or means for retaining is at least partially implemented using hardware.

21. The machine of claim 1, wherein circuitry for retaining at the high resolution the portion of the audio data stream associated with the presence of the sound of interest, the retaining at the high resolution relative to retention of another portion of the audio data stream not associated with the presence of the sound of interest and designated for retention at a resolution lower than the high resolution comprises:

circuitry for retaining at the high resolution the portion of the audio data stream associated with the presence of the sound of interest, the retaining at the high resolution including at least retaining at an equal resolution to a resolution of a source audio stream associated with the audio data stream.

22. The machine of claim 21, further comprising:

circuitry for retaining the another portion of the audio data stream at a resolution lower than the resolution of the source audio stream.

23. The machine of claim 22, wherein circuitry for retaining the another portion of the audio data stream at a resolution lower than the resolution of the source audio stream comprises:

circuitry for discarding the another portion of the audio data stream.

24. The machine of claim 1, wherein circuitry for accepting input for a designation of a reference designator associated with a sound of interest in an audio data stream comprises:

circuitry for accepting input for a designation of a reference designator associated with a sound of interest in an audio data stream, including at least circuitry for accepting at least one frequency spectrum characteristic associated with the sound of interest.

25. The machine of claim 24, wherein circuitry for accepting input for a designation of a reference designator associated with a sound of interest in an audio data stream, including at least circuitry for accepting at least one frequency spectrum characteristic associated with the sound of interest comprises:

circuitry for accepting input for a designation of a reference designator associated with a sound of interest in an audio data stream, including at least circuitry for accepting at least (i) a higher frequency cutoff below which the audio data stream is to be retained at a high resolution and (ii) a lower frequency cutoff above which the audio data stream is to be retained at a high resolution.

26. The machine of claim 25, wherein circuitry for accepting input for a designation of a beginning demarcation designator associated with a beginning of a presence in the audio data stream of the sound of interest designated by the reference designator comprises:

circuitry for accepting a sonic input associated with designation of a beginning demarcation designator associated with a beginning of a presence in the audio stream of at least some audio associated with a particular frequency range, the particular frequency range defined by at least (i) the accepted higher frequency cutoff below which the audio data stream is to be retained at a high resolution and (ii) the accepted lower frequency cutoff above which the audio data stream is to be retained at a high resolution.

27. The machine of claim 25, wherein circuitry for accepting input for a designation of a beginning demarcation designator associated with a beginning of a presence in the audio data stream of the sound of interest designated by the reference designator comprises:

circuitry for accepting a sonic input associated with designation of a beginning demarcation designator associated with a beginning of a presence in the audio stream of at least some audio associated with a particular frequency range, the particular frequency range defined by at least (i) the accepted higher frequency cutoff below which the audio data stream is to be retained at a high resolution and (ii) the accepted lower frequency cutoff above which the audio data stream is to be retained at a high resolution, the circuitry for accepting a sonic input including at least circuitry for analyzing the audio data stream to determine the presence of the at least some audio associated with the particular frequency range.

28. The machine of claim 27, wherein circuitry for accepting input for a designation of an ending demarcation designator associated with an ending of the presence in the audio data stream of the sound of interest designated by the reference designator comprises:

circuitry for accepting a sonic input associated with designation of an ending demarcation designator associated with an ending of the presence in the audio stream of the at least some audio associated with the particular frequency range, including at least circuitry for analyzing the audio data stream to determine the ending of the presence of the at least some audio associated with the particular frequency range.

29. The machine of claim 1, wherein circuitry for accepting input for a designation of a reference designator associated with a sound of interest in an audio data stream comprises:

circuitry for accepting input for a designation of a reference designator associated with a sound of interest in an audio data stream, including at least circuitry for accepting at least one frequency spectrum characteristic associated with one or more voices of interest.

30. The machine of claim 1, wherein circuitry for retaining at the high resolution the portion of the audio data stream associated with the presence of the sound of interest, the retaining at the high resolution relative to retention of another portion of the audio data stream not associated with the presence of the sound of interest and designated for retention at a resolution lower than the high resolution comprises:

circuitry for retaining at the high resolution the portion of the audio data stream associated with the presence of one or more voices of interest, the one or more voices of interest defined by at least (i) an accepted higher frequency cutoff below which the audio data stream is to be retained at a high resolution and (ii) an accepted lower frequency cutoff above which the audio data stream is to be retained at a high resolution, and circuitry for discarding at least another portion of the audio data stream not associated with the presence of the one or more voices of interest.

* * * * *